3,148,183
Δ⁴ AND Δ⁴,⁶-17α-ACYLOXY-20-OXO-STEROID-[3,2-c]
PYRAZOLES OF THE PREGNANE SERIES
Ralph F. Hirschmann, Scotch Plains, Arthur A. Patchett, Metuchen, Avery Rosegay, Springfield, and Gerald J. Kent, Princeton, N.J., assignors to Merck & Co., Inc., Rahway, N.J., a corporation of New Jersey
No Drawing. Filed June 20, 1962, Ser. No. 203,748
16 Claims. (Cl. 260—239.5)

This invention is concerned generally with novel [3,2-c]pyrazole compounds of the pregnane series, and with processes of preparing the same. More particularly, it relates to 17α-hydroxy-20-oxo-4-pregneno- (and 4,6-pregnadieno)-[3,2-c]pyrazoles, and to processes of making these compounds. It also relates to the 17α-ethers and 17α-acyloxy-derivatives of the 17α-hydroxy-4-pregnene (and 4,6-pregnadieno)-[3,2-c]pyrazoles.

These novel [3,2-c]pyrazole compounds may be chemically represented as follows:

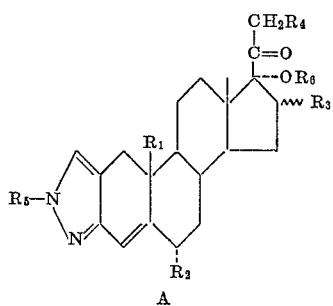

A

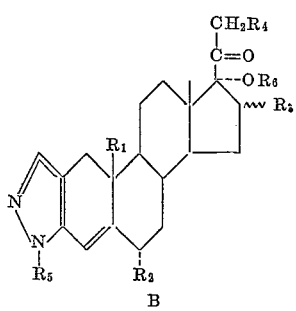

B wherein $R_1$ is selected from the group consisting of hydrogen and methyl, $R_2$ is selected from the group consisting of hydrogen, α-methyl, α-fluoro and α-chloro, $R_3$ is selected from the group consisting of hydrogen, α-fluoro, α-methyl, β-methyl and methylene, $R_4$ is selected from the group consisting of hydrogen, hydroxy, acyloxy and fluoro, $R_5$ is selected from the group consisting of hydrogen, alkyl, cycloalkyl, aralkyl, aryl, a heterocyclic nucleus or substituted derivatives thereof, and $R_6$ is selected from the group consisting of hydrogen, acyl, alkyl, aralkyl and alkenyl. This invention also includes the Δ⁴,⁶-analogues of all of the above compounds.

The above defined [3,2-c]pyrazole compounds are intermediates in the production of the corresponding 11β-hydroxy-[3,2-c]pyrazoles by microbiological oxidation. The 11β-hydroxy-[3,2-c]pyrazoles possess high anti-inflammatory activity and are especially effective for the treatment of arthritis and related diseases since they can be administered for their cortisone-like action in low dosage, thereby minimizing undesirable side effects.

The 17α-hydroxy-20-oxo-4-(pregneno- and 4,6-pregnadieno)-[3,2-c]pyrazoles are prepared by the method described in Flow Sheet A, or by the method described in Flow Sheet B. For obtaining a particular compound, the choice of method may be determined by the availability of the starting materials, among other considerations. The starting materials for our invention can also be prepared by the introduction of the various substituents, namely the 16α-methyl-, 16β-methyl-, 16-methylene-, 6α-methyl-, 6α-chloro-, and 6α-fluoro- into the 17α-hydroxy-4-pregnene-3,20-dione or 17α-hydroxy-4,6-pregnadiene-3,20-dione (Flow Sheet A), or the 17α,21-dihydroxy-4-pregnene-3,20-dione or 17α,21-dihydroxy-4,6-pregnadiene-3,20-dione (Flow Sheet B), using known procedures capable of general application.

Following the synthesis described in Flow Sheet A, the 17α-hydroxy-4-pregnene-(or 4,6-pregnadiene)-3,20-dione is converted into the 17α-tetrahydropyranyl ether. This may be accomplished by refluxing under anhydrous conditions with dihydropyran in the presence of an acidic reagent such as tosyl chloride.

The 17α-tetrahydropyranyloxy-4-pregnene-(or 4,6-pregnadiene)-3,20-dione (Compound 2) is reduced to the corresponding 17α-tetrahydropyranyloxy-4-pregnene-(or 4,6-pregnadiene)-3,20-diol, for example, by heating with lithium aluminum hydride in a solvent such as tetrahydrofuran. The 17α-tetrahydropyranyloxy-4-pregnene-(or 4,6-pregnadiene)-3,20-diol (Compound 3), is then oxidized to 17α-tetrahydropyranyloxy-20-hydroxy-4-pregnene-(or 4,6-pregnadiene)-3-one, conveniently by the use of manganese dioxide.

Upon treatment of the 17α-tetrahydropyranyloxy-20-hydroxy-4-pregnene-(or 4,6-pregnadiene)-3-one (Compound 4) with an alkyl formate and sodium hydride in an inert atmosphere there is formed the corresponding 2-hydroxymethylene-derivative. The 2-hydroxymethylene derivative (Compound 5) reacts with hydrazine in an inert atmosphere to form the corresponding 4-pregneno- (or 4,6-pregnadieno)-[3,2-c]pyrazole (Compound 6).

Upon treatment of the 2-hydroxymethylene-4-pregnene-(or 4,6-pregnadieno)-3-one (Compound 5) with a lower alkanol in the presence of an acidic reagent, such as a p-toluenesulfonic acid, the corresponding 2-alkoxymethylene-derivative is formed. When the latter compound is reacted with a monosubstituted hydrazine, the corresponding N-substituted-4-pregneno-(or 4,6-pregnadieno)-[3,2-c]pyrazole compounds (Compounds A and B) are formed. The N-substituted-4-pregneno-(or 4,6-pregnadieno)-[3,2-c]pyrazoles having structure A are designated as the 1'-substituted-4-pregneno-[3,2-c]pyrazoles, and the N-substituted-pyrazole compounds having structure B are designated as the 2'-substituted-4-pregneno-[3,2-c]pyrazoles.

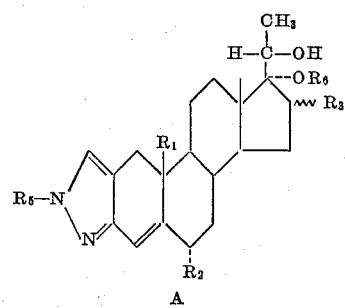

A

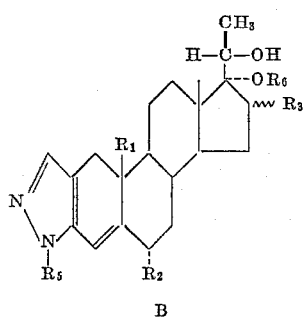

B wherein $R_1$, $R_2$, $R_3$, and $R_5$ have the significance above defined, and $R_6$ is tetrahydropyranyl. The corresponding 4,6-pregnadieno-[3,2-c]pyrazoles are similarly designated as the 1'- and 2'- substituted - 4,6 - pregnadieno-[3,2-c] pyrazoles.

Upon treatment of a 2-hydroxymethylene-compound directly with a monosubstituted arylhydrazine, without the intermediate formation of the 2-alkoxymethylene compound, one isomer is generally formed in preponderant amounts, whereas when reacting the 2-alkoxymethylene compound with a monosubstituted arylhydrazine, significant amounts of both isomers are obtained. When these reactions take place with mono-substituted alkylhydrazines, mixtures may be obtained starting with the 2-hydroxymethylene-steroid as well as with the 2-alkoxymethylene-steroid. A mixture of isomers may also result from the reaction of a monosubstituted hydrazine with a 2-hydroxymethylene-compound which possibly contains variable amounts of the 2-alkoxymethylene-compound due to the operating procedures employed, for example, due to recrystallization in the presence of a trace of alcohol a solution of the 2-hydroxymethylene-compound from which has not been completely removed.

Among the monosubstituted hydrazines which may be used for the process of our invention are: alkylhydrazines, such as methylhydrazine, ethylhydrazine, propylhydrazines, butylhydrazines, β-hydroxyethylhydrazine, cycloalkylhydrazines; arylhydrazines including phenylhydrazine and the substituted phenylhydrazines, such as o-, m-, and p-halophenylhydrazines, o-, m-, and p-tolylhydrazines, o-, m-, and p-alkoxyphenylhydrazines, o-, m-, and p-nitrophenylhydrazines, 1-hydrazinonaphthalene, 2-hydrazinopyridine, 3-hydrazinopyridine, 4-hydrazinopyridine, 4-hydrazinopyridine oxide, 2-hydrazinopyrimidine 2- and 3-hydrazinothiophene; aralkylhydrazines, such as benzylhydrazine and phenylethylenehydrazine.

There are thus produced the corresponding [3,2-c]pyrazoles including: N-alkyl such as N-methyl-, N-ethyl-, N-butyl-, N-propyl-, N-(β-hydroxyethyl)-; N-cycloalkyl-; N-aryl- which may be derived from any aromatic nucleus, including N-phenyl- and the N-substituted-phenyl derivatives such as o-, m-, and p-halophenyl; o-, m-, and p-tolyl-; o-, m-, and p-alkoxyphenyl-, o-, m-, and p-nitrophenyl-; N-(1''-naphthyl)-, N-(2''-pyridyl)-, N-(3''-pyridyl)-, N-(4''-pyridyl)-, N-(4''-pyridyloxide)-, N-(2''-pyrimidyl)-, N-(2''-thiophene)- and N-(3''-thiophene)- N-aralkyl-, such as N-benzyl- and N-phenylethenyl-pyrazole compounds. The N-alkyl-pyrazole compounds may also be prepared by direct alkylation of the N-unsubstituted-pyrazole compounds.

The 17α - tetrahydropyranyloxy - 20 - hydroxy-4-pregneno-(or 4,6-pregnadieno)-[3,2-c]pyrazoles (Compound VI-A or VI-B of Flow Sheet A) are oxidized to the corresponding 17α-tetrahydropyranyloxy-20-oxo-4-pregneno- (or 4,6-pregnadieno)-[3,2-c]pyrazoles, suitably by using a chromium trioxide-sulfuric acid reagent which is prepared by dissolving chromium trioxide in concentrated sulfuric acid, and then diluting with water.

The 17α-tetrahydropyranyloxy-20-oxo-4-pregneno- (or 4,6-pregnadieno)-[3,2-c]pyrazole (Compound 7) is converted into the corresponding 17α-hydroxy-derivative (Compound 8) by dissolving in methanol and treating with a solution of p-toluenesulfonic acid monohydrate in methanol.

Following the synthesis described in Flow Sheet B, a 17α,21-dihydroxy-4-pregnene (or 4,6-pregnadiene)- 3,20-dione starting material (Compound 1) is reacted with aqueous formaldehyde solutions in the presence of strong acid to form compounds having the formula:

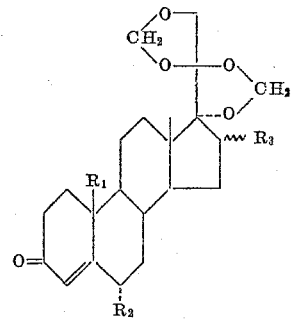

and the $\Delta^{4,6}$-analogues of the above compounds, wherein $R_1$ is methyl or hydrogen, $R_2$ is selected from the group consisting of hydrogen, α-methyl-α-chloro and α-fluoro, and $R_3$ is selected from the group consisting of α-methyl, β-methyl, methylene and α-fluoro. For example, cold concentrated HCl and formalin are added to a stirred suspension of the steroid in chloroform, cooled to about 0° C. The mixture is then allowed to come to room temperature and stirred for several hours to afford the corresponding 17α, 20, 20, 21-bis(methylenedioxy)-derivative.

Upon treatment of the above compound with an alkyl formate and sodium hydride in an inert atmosphere there is formed the corresponding 17α, 20, 20, 21-bis(methylenedioxy) - 2-hydroxymethylene-4-pregnene-(or 4,6-pregnadiene)-3-one (Compound 3). In a preferred embodiment of our invention the steroid is dissolved in a solvent such as benzene and the resulting solution is cooled to room temperature and treated with ethyl formate. The air in the system is replaced with nitrogen, sodium hydride is added and the mixture is stirred at room temperature for several hours.

The 17α, 20, 20, 21-bis(methylenedioxy)-2-hydroxymethylene-4-pregnene (or 4,6-pregnadiene)-3-one compound reacts with hydrazine in an inert atmosphere to form the corresponding 17α, 20, 20, 21-bismethylenedioxy) - 4- pregneno - (or 4,6 - pregnadieno) - [3,2 - c]-pyrazole.

Upon treatment of a 17α, 20, 20, 21-bis(methylenedioxy) - 2 - hydroxymethylene - 4 - pregnene - (or 4,6-pregnadiene)-3-one compound with a lower alkanol in the presence of an acidic reagent such as a p-toluenesulfonic acid the corresponding 17α, 20, 20, 21-bis-(methylenedioxy) - 2 - alkoxymethylene - 4 - pregnene- (or 4,6-pregnadiene)-3-one is formed. When the latter compound is reacted with a monosubstituted hydrazine, the corresponding N-substituted-4-pregneno-(or 4,6-pregnadieno)-[3,2-c]pyrazoles (Compounds 4A and 4B) are formed. The N-substituted-[3,2-c]pyrazoles having structure "A" are designated as the 1'-substituted-[3,2-c]-pyrazoles, and the N-substituted-pyrazole compounds having structure "B" are designated as the 2'-substituted-

[3,2-c]-pyrazoles; in these formulas the linkage between carbons 6 and 7 may be a single or double bond linkage.

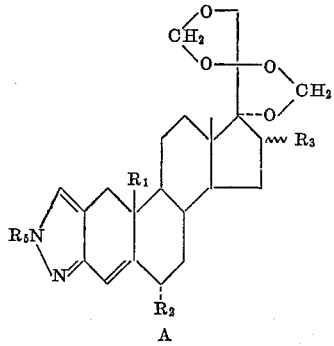

A

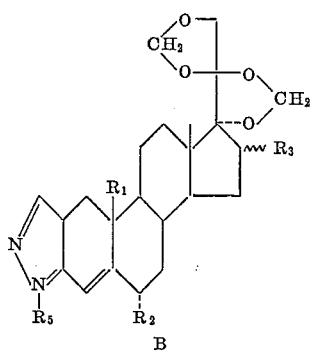

B wherein $R_1$, $R_2$ and $R_3$ have the significance above defined, and $R_5$ is hydrogen, alkyl, cycloalkyl, aryl, aralkyl, a heterocyclic nucleus, or substituted derivatives thereof. The products formed may be separated by chromatography.

Upon treatment of a 17α, 20, 20, 21-bis(methylenedioxy)-2-hydroxymethylene compound directly with a monosubstituted arylhydrazine, without the intermediate formation of the 2-alkoxymethylene-derivative, one isomer is generally formed in preponderant amounts, whereas when reacting the 17α, 20, 20, 21-bis(methylenedioxy)-2-alkoxymethylene-4-pregnene-3-one compound with a monosubstituted arylhydrazine, significant amounts of both isomers are obtained. When these reactions take place with monosubstituted alkylhydrazines, mixtures may be obtained when starting with the 2-hydroxymethylene-steroid as well as with the 2-alkoxymethylene-steroid. A mixture of isomers may also result from the reaction of a monosubstituted hydrazine with a 2-hydroxymethylene-compound which possibly contains variable amounts of the 2-alkoxymethylene-derivative due to the operating procedures employed, for example, due to recrystallization in the presence of a trace of alcohol a solution of the 2-hydroxymethylene-compound from which acid has not been completely removed.

The monosubstituted hydrazines which may be used for the process of Flow Sheet B are those listed in column 3.

Upon treatment of any of the above described 17α, 20, 20, 21-bis(methylenedioxy)-[3,2-c]pyrazole compounds (Compounds 4A and 4B) with a dilute organic acid, for example, a 60% aqueous solution of formic acid, the 17α, 20, 20, 21-bis(methylenedioxy)-protecting group is removed and there is obtained the corresponding 17α, 21-dihydroxy-20-oxo[3,2-c]pyrazoles which are represented by Compounds 5A and 5B.

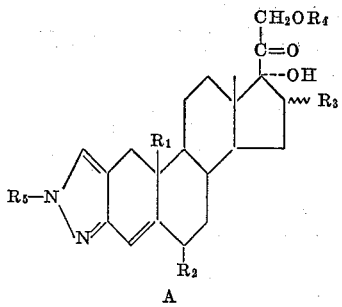

A

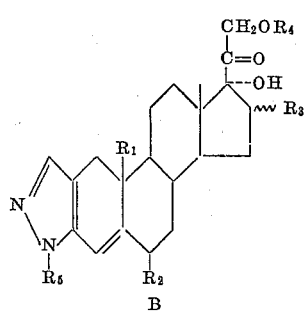

B wherein the linkage between carbons 6 and 7 may be a single or double bond linkage and wherein $R_1$ is hydrogen or methyl; $R_2$, $R_3$ and $R_5$ have the meaning described above, and $R_4$ is hydrogen or an acyl group corresponding to the organic acid used in this reaction. An acyl group may also be present at $R_5$ when the reactant (Compound 4) is an unsubstituted pyrazole.

Any acyl groups present at $R_4$ and/or at $R_5$ may be removed by treating the steroid with sodium methoxide in methanol at room temperature. Acyl groups present at the $R_4$ position may be selectively removed by treatment with aqueous acetic acid. Acylating agents which can be used for this purpose include a lower hydrocarbon carboxylic acid acylating agent such as benzoic anhydride, tertiary butyl acetyl chloride; a lower alkanoic anhydride or lower alkanoyl halide such as acetic anhydride, propionic anhydride or acetyl chloride; or a polybasic anhydride such as β,β-dimethyl-glutaric anhydride, succinic anhydride and the like, in the presence of an organic base such as pyridine.

The 17α, 21-dihydroxy-[3,2-c]pyrazole is reacted with methane sulfonyl chloride in a non-aqueous base to form the 21-mesylate (Compound 6). A steroid in which $R_5$ is hydrogen is preferably converted to the N-carbamyl derivative before undergoing this reaction.

The 21-fluoro-17α-hydroxy-pyrazoles (Compound 8) are prepared from the corresponding 17α,21-dihydroxy-[3,2-c]pyrazole 21-mesylates by heating with an alkali fluoride in a solvent to form a mixture of a 17α,21-expoxy-compound and the corresponding 21-fluoro-compound. These compounds are separated by partition chromatography, or by chromatography on a weak adsorbent such as silica gel.

The 17α, 21-dihydroxy-[3,2-c]pyrazole 21-mesylate is heated with an alkali iodide to form the 21-iodo-compound (Compound 7). In a preferred method for carrying out this reaction, sodium iodide is added to the steroid dissolved in acetone and the resulting mixture is heated at reflux temperature for approximately one hour.

The 17α-hydroxy-21-iodo-[3,2-c]pyrazole is heated with an alkali bisulfite in a solvent to form the corresponding 21-desoxy-compound (Compound 9). A preferred method is to add sodium bisulfite to a suspension of the steroid in aqueous ethanol and then heat the mixture under reflux for a period of about an hour.

An N-carbamyl group is removed by treatment with nitrous acid. For example, the steroid is treated in glacial acetic acid solution with sodium nitrite.

All of the [3,2-c]pyrazoles described in the foregoing structures form salts such as the hydrochloride, sulfate, chlorate, perchlorate, picrate and trichloroacetate, on treatment with the corresponding acid. Formation of crystalline salts, especially the hydrochloride salts, is sometimes helpful as a means of purifying the [3,2-c]pyrazoles.

Acylation of the above pyrazole products with pyridine and an acyl anhydride leads to 21-acyl derivates except when $R_4$ is hydrogen, in which case N,21-diacyl derivatives result. Optionally, the latter derivatives may be further heated with dilute aqueous acetic acid to remove selectively the N-acyl group.

The $17\alpha$-acyl-derivatives of the $17\alpha$-hydroxy-4-pregneno- (and 4,6-pregnadieno)-[3,2-c]pyrazoles are prepared by acylation of the corresponding $17\alpha$-hydroxy-compound.

The $17\alpha$-hydroxy-compound is readily acylated by reaction with a lower aliphatic acid anhydride at elevated temperatures. In general, it has been found necessary to carry out this $17\alpha$-acylation step at temperatures in excess of about 100° C. for extended periods of time. Thus, the acylation can most conveniently be achieved by refluxing the reaction mixture for a period in excess of about 5 hours, and generally for about 10–12 hours for optimum results.

Alternatively instead of employing high temperatures to carry out this step, acylation of the $17\alpha$-hydroxy-compound may be achieved at room temperature by reaction with an acid anhydride in the presence of an acid catalyst such as mineral acids, for example, hydrochloric acid, sulfuric acid and the like, or a sulfonic acid such as p-toluene sulfonic acid. With the latter catalyst, the reaction time at room temperature is generally about eighteen hours.

As acylating agents it is desirable to use such aliphatic acid anhydrides as acetic anhydride, propionic acid anhydride or butyric acid anhydride, although it will be understood that similar acid anhydrides derived from other carboxylic acids may likewise be employed in this acylation procedure.

The $17\alpha$-acyloxy derivatives obtained in accordance with this process may be recovered from the reaction mixture by diluting it with water, and cooling the mixture until the desired product is precipitated. Alternatively, the reaction mixture can be concentrated in vacuo and the resulting residue triturated with water and filtered to obtain the precipitated acyloxy compound.

When the [3,2-c]pyrazole is unsubstituted, ($R_5$ is hydrogen) the $R_5$ hydrogen is also replaced by the corresponding acyl group in the above described acylation reaction. The acyl group at $R^5$ may then be selectively removed without removal of the acyloxy group at the $17\alpha$-position by heating with sodium hydroxide for about 30 minutes (See Flow Sheet C).

The $17\alpha$-ethers of the $17\alpha$-hydroxy-20-oxo-4-pregneno- (and 4,6-pregnadieno)-[3,2-c]pyrazoles are prepared by contacting the $17\alpha$-hydroxy-steroid (Compound 1 of Flow Sheet A) with a monohalogenated hydrocarbon in which the halogen substituent is either bromine or iodine in the presence of a mild base such as silver oxide. Included among the halogenated hydrocarbons which may be used in the process of our invention are saturated alkyl bromides or iodides including cycloalkyl as, for example, methyl iodide, ethyl iodide, n-propyl iodide, n-pentyl iodide, ethyl bromide, n-propyl bromide, isopropyl bromide, n-pentyl bromide and bromocyclohexane; aralkyl bromides and iodides as, for example, benzyl iodide and benzyl bromide; and unsaturated halogenated hydrocarbons such as allyl iodide, and methallyl iodide. By selecting one of the above-named halogenated hydrocarbons and reacting it with a selected $17\alpha$-hydroxy steroid of the pregnane series in accordance with the process of my invention, there is formed the corresponding $17\alpha$-ether of the starting $17\alpha$-hydroxy steroid in which the hydrogen of the $17\alpha$-hydroxy group is replaced by a hydrocarbon radical derived from the selected hydrocarbon reactant.

In order to bring about etherification of the $17\alpha$-hydroxy group it is necessary to employ, in addition to the halogenated hydrocarbon, a mild base such as silver oxide. An especially desirable form of silver oxide is prepared by the following procedure: 1 part by weight of silver nitrate is dissolved in approximately 10 parts by weight of water. Another solution is prepared by dissolving 0.23 part by weight of pure sodium hydroxide in approximately 10 parts by weight of water. The two solutions are heated to approximately 86° C. and mixed, whereupon the silver oxide precipitates. The supernatant liquid is decanted and the silver oxide precipitate is washed by decantation with 5 portions of hot water or until the washings are essentially neutral. The precipitate of silver oxide is then filtered and air-dried. The precipitated, dried silver oxide is then slurried in about 5 parts of hot ethanol. The ethanol is decanted from the precipitate and the precipitate is then washed several more times with hot ethanol by decantation. The washed precipitate is filtered and air-dried, and then dried in a desiccator over phosphorus pentoxide.

The solvent used for carrying out the etherification reaction may be any one which is inert or unreactive under the conditions of the etherification reaction. Thus, solvents which are effective as diluents are hydrocarbons as, for example, benzene, toluene, xylene; ethers such as diethyl ether, dioxane, tetrahydrofuran and anisole; N,N-dialkyl acylamides as, for example, N,N-dimethylacetamide, N,N-dimethylformamide and N,N-diethylformamide, and nitriles such as acetonitrile. In addition to solvents which may act as diluents for the reagent, the monohalogenated hydrocarbon may act as a solvent for the reaction and, when it is desired to use large excesses of the monohalogenated hydrocarbon reactant, it may be desirable to use, instead of an additional solvent, the reagent itself as a solvent for the reaction.

The temperature at which the reaction is carried out is partially dependent on the time and does not appear to be the sole critical factor in the yield or purity of the product obtained. Thus, temperatures which vary from approximately 5° C. to the reflux temperature of the solvent employed appear to be satisfactory. Thus, we have found that when the reactants are mixed in the presence of a solvent at approximately 25° C. for a period of about 16 hours, good yields of product are obtained. Another method which has been found to produce satisfactory yields of the ether involves refluxing the steroid in the presence of silver oxide and methyl iodide for approximately 7 hours with no additional solvent added to the reaction mixture.

In a preferred mode of operation the $17\alpha$-methoxy steroid is prepared from the corresponding $17\alpha$-hydroxy-steroid by mixing the steroid with a large molar excess of methyl iodide and dimethylformamide as a solvent in the presence of silver oxide. The mixture is stirred at room temperature for about 4 days. The product is recovered by extraction and chromatography.

The $17\alpha$-methoxy-ether of the 4-pregnene-3,20-dione is specifically named for purposes of discussion to illustrate the process of our invention, although it is to be understood that the process is likewise applicable to all of the $17\alpha$-ether-compounds defined by Compound 2 of Flow Sheet A. The $17\alpha$-methoxy-4-pregnene-3,20-dione (2) is reduced to the corresponding $17\alpha$-methoxy-4-pregnene-3,20-diol (3), for example by heating with lithium aluminum hydride in a solvent such as tetrahydrofuran. The $17\alpha$-methoxy-4-pregnene-3,20-diol (3), is then oxidized to $17\alpha$-methoxy-20-hydroxy-4-pregnene-3-one (4), for example, with the use of manganese dioxide.

Upon treatment of the 17α-methoxy-20-hydroxy-4-pregnene-3-one (4) with an alkyl formate and sodium hydride in an inert atmosphere there is formed the corresponding 2-hydroxymethylene-derivative (5). The 2-hydroxymethylene compound (5) reacts with hydrazine in an inert atmosphere to form the corresponding 4-pregneno-[3,2-c]-pyrazoles (6).

Upon treatment of the 2-hydroxymethylene-4-pregnene-3-one compound with a lower alkanol in the presence of an acidic reagent such as a p-toluenesulfonic acid the corresponding 2 - alkoxymethylene - 4-pregnene-3-one is formed. When the latter compound is reacted with a monosubstituted hydrazine, the corresponding N-substituted [3,2-c]pyrazole compounds are formed (6A and 6B). The N-substituted-[3,2-c]pyrazoles having structure A are designated as the 1′-substituted-[3,2-c]pyrazoles, and the N-substituted-pyrazole compounds having structure B are designated as the 2′-substituted-[3,2-c]pyrazoles.

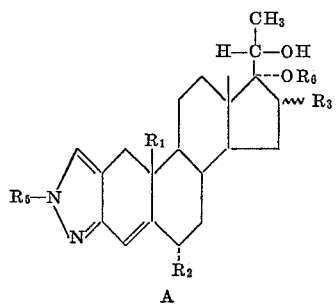

A

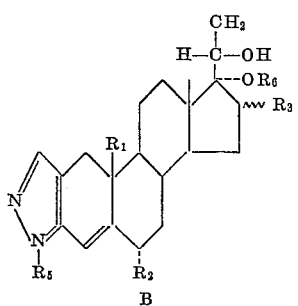

B wherein $R_1$, $R_2$, $R_3$, and $R_5$ have the significance above defined, and $R_6$ stands for alkyl, alkenyl or aralkyl. The products formed may be separated by chromatography. The corresponding $\Delta^{4,6}$-pregnadiene are similarly designated as the 1′- and 2′-substituted-4,6-pregnadiene-[3,2-c]pyrazoles.

Upon treatment of a 2-hydroxymethylene-compound directly with a monosubstituted arylhydrazine, without the intermediate formation of the 2-alkoxymethylene-derivative, one isomer is generally formed in preponderant amounts, whereas when reacting the 2-alkoxymethylene with a monosubstituted arylhydrazine, significant amounts of both isomers are obtained. When these reactions take place with monosubstituted alkylhydrazines, mixtures may be obtained when starting with the 2-hydroxymethylene-steroid. A mixture of isomers may also result from the reaction of a monosubstituted hydrazine with a 2-hydroxymethylene-compound which possibly contains variable amounts of the 2-alkoxymethylene-derivative due to the operating procedures employed, for example, due to recrystallization in the presence of a trace of alcohol a solution of the 2-hydroxymethylene-compound from which acid has not been completely removed.

Among the monosubstituted hydrazines which may be used for the process of our invention are those listed on page 6.

The novel [3,2-c]pyrazoles of the present invention are converted to the corresponding 11β-hydroxy-[3,2-c] pyrazole by the microbiological oxidation procedure of Example 28.

FLOW SHEET A

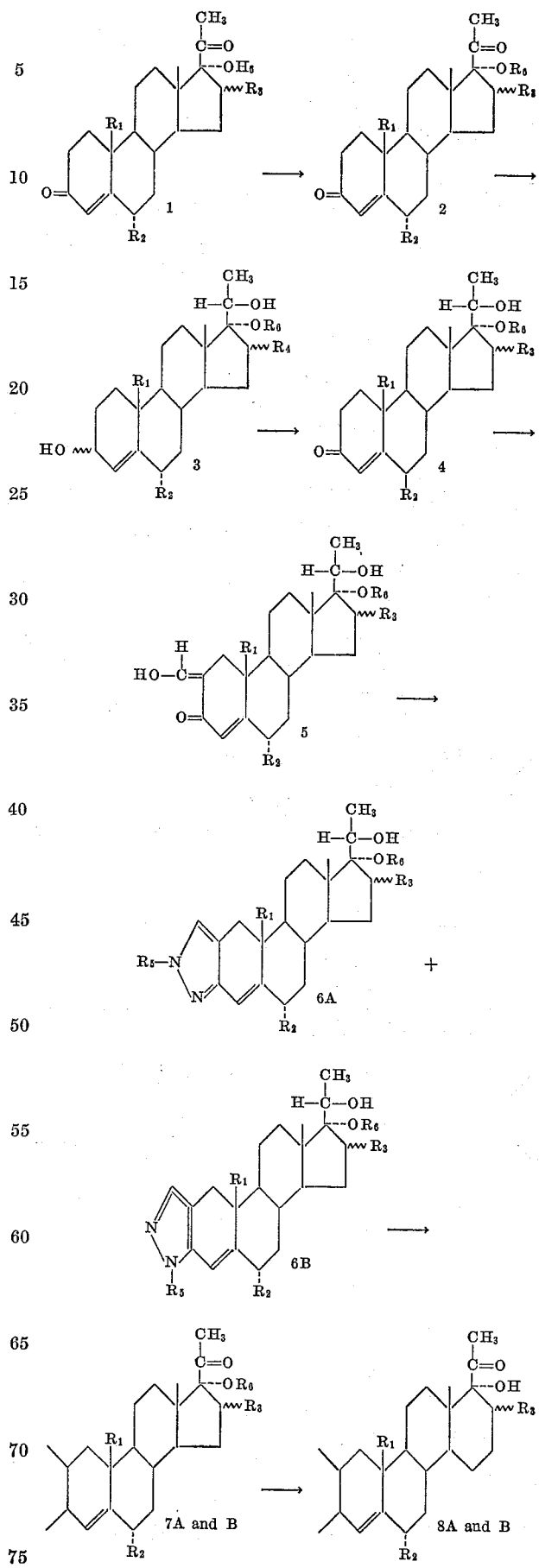

FLOW SHEET B
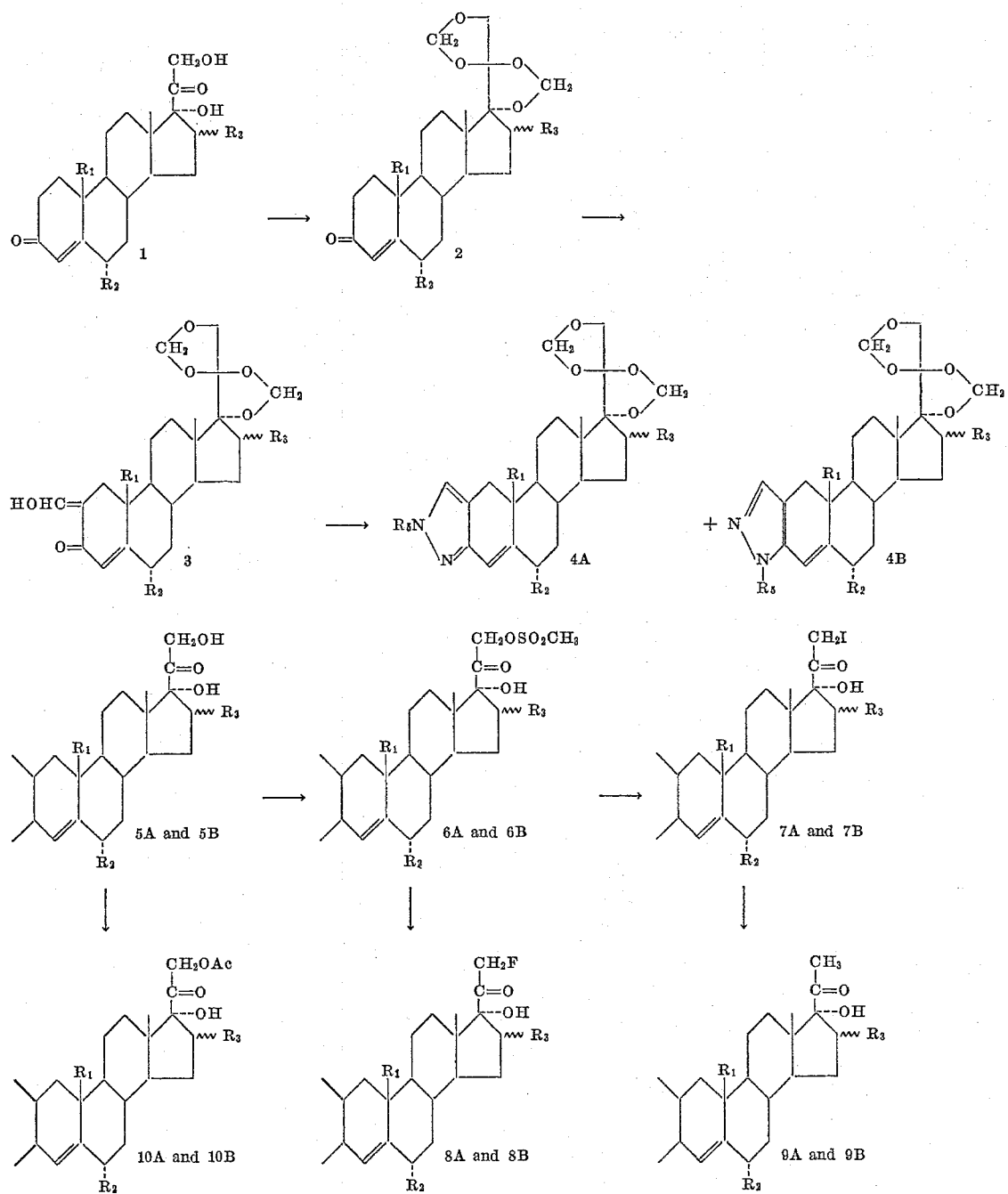
FLOW SHEET C
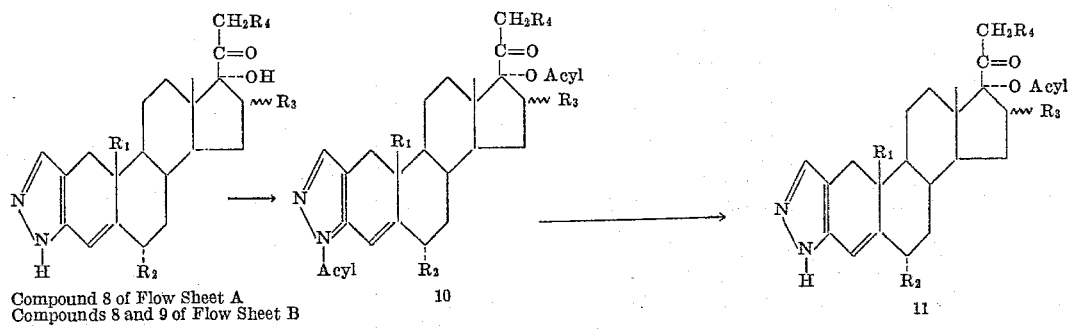
Compound 8 of Flow Sheet A
Compounds 8 and 9 of Flow Sheet B

FLOW SHEET C—Continued

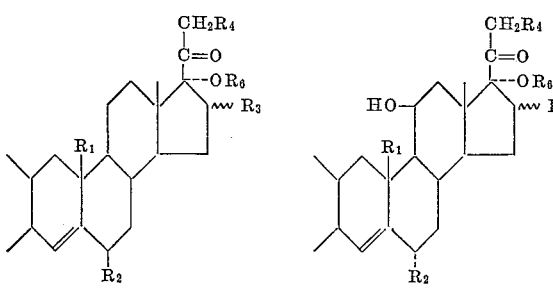

Compounds A and B of Page 1

In the formulas in the preceeding Flow Sheets A, B and C the linkage between carbons 6 and 7 may be a single or double bond linkage; $R_1$ is selected from the group consisting of hydrogen and methyl; $R_2$ is selected from the group consisting of hydrogen, $\alpha$-methyl, $\alpha$-fluoro and $\alpha$-chloro; $R_3$ is selected from the group consisting of hydrogen, $\alpha$-methyl, $\beta$-methyl, methylene, and $\alpha$-fluoro; $R_4$ is selected from the group consisting of hydrogen, hydroxy, acyloxy and fluoro; $R_5$ is selected from the group consisting of hydrogen, alkyl, cycloalkyl, aralkyl, aryl and a heterocyclic nucleus, or substituted derivatives thereof; and R is selected from the group consisting of hydrogen, alkyl, aralkyl, alkenyl and tetrahydropyranyloxy.

The following examples illustrate methods of carrying out the present invention but it is to be understood that these examples are given for purposes of illustration and not of limitation.

Example 1

A solution of 10 g. of 17$\alpha$-hydroxy-4-pregnene-3,20-dione in 3 g. of tosyl chloride and 150 ml. of dihydropyran, B.P. 86° C., distilled from sodium hydride, is refluxed for 18 hours. After cooling, 100 ml. of 10% sodium carbonate solution is added, and the mixture is stirred for 1 hour. The organic layer is separated, washed with saturated salt solution, dried over magnesium sulfate, and concentrated under reduced pressure to a viscous residue. The residue is dissolved in 50 ml. of a 4:1 mixture of n-hexane-benzene and chromatographed on basic alumina. The product is crystallized by dissolving in 2 parts of methylene chloride and adding about 16 parts of n-hexane. Successive processing of the mother liquor yields a total of 7.1 g. of 17$\alpha$-tetrahydropyranyloxy-4-pregnene-3,20-dione, M.P. about 155–65° C.

Example 2

A mixture of 3.6 g. of 17$\alpha$-tetrahydropyranyloxy-4-pregnene-3,20-dione, 2.0 g. of lithium aluminum hydride and 100 ml. of tetrahydrofuran (distilled over lithium aluminum hydride) is stirred under reflux for 1 hour. About 40 ml. of solvent is then distilled, and the mixture is cooled and treated with ethyl acetate to destroy the excess sodium hydride. With continued stirring, saturated salt solution is added in small portions until a granular deposit of salt is formed. The mixture is filtered, and the filtrate is concentrated under reduced pressure to give a 17$\alpha$-tetrahydropyranyloxy-4-pregnene-3$\zeta$,20-diol, which is a colorless, non-crystalline residue and shows no carbonyl absorption in the infrared.

Example 3

The 17$\alpha$-tetrahydropyranyloxy-4-pregnene-3$\zeta$,20-diol obtained in Example 2 is dissolved in 40 ml. of acetone, and 30 g. of activated manganese dioxide is added. The mixture is stirred for 18 hours at room temperature, filtered through infusorial earth (Celite), and the manganese dioxide is washed thoroughly with methylene chloride. The combined filtrates are concentrated under reduced pressure. The residue is dissolved in ether and chromatographed on basic alumina. The column is washed with ether until the eluate is free of residue, and then the product is eluted with a 1:9 solution of chloroform-ether. Evaporation of the solvent leaves a 66% yield of a colorless glass, 17$\alpha$-tetrahydropyranyloxy-20-hydroxy-4-pregnene-3-one, $$\lambda_{max.}^{MeOH}\ 241,\ E\%\ 362.$$

Example 4

Ethyl formate (1.5 ml.) is added to a solution of 1.63 g. of 17$\alpha$-tetrahydropyranyloxy-20-hydroxy-4-pregnene-3-one in 35 ml. of dry benzene, and the system is flushed with dry nitrogen. Sodium hydride (1.5 g. as a 53% oil dispersion) is added, and after flushing again with nitrogen, the mixture is stirred for 2 hours at room temperature. After cooling, 30 ml. of ether and 30 ml. of a saturated solution of sodium dihydrogen phosphate solution are added, and the mixture is shaken for about 5 minutes. The layers are separated, the water layer is washed with ether, and the combined ether extracts are washed with saturated salt solution. The product is then extracted with six 15 ml. portions of 2% sodium hydroxide solution and the combined basic extracts are washed three times with ether. The alkaline solution is acidified to a pH of 6 using saturated sodium dihydrogen phosphate solution, and then extracted several times with ether. After washing the combined ether extracts with saturated salt solution and then drying over sodium sulfate, partial evaporation of solvent gives 400 mg. of crude, crystalline product, M.P. 152–5° C. The mother liquor is evaporated to dryness and the residue is dissolved in 2 ml. of ether to afford a second crop (450 mg.) of product, M.P. 153–5° C. The total yield of crude product is about 49%

$$\lambda_{max.}^{MeOH}\ (\text{in base})\ 357\ m\mu,\ E\%\ 231;\ 242\ m\mu,\ E\%\ 344$$

Several recrystallizations from methylene chloride-ether gives an analytical sample of 20-hydroxy-2-hydroxymethylene-17$\alpha$-tetrahydropyranyloxy-4-pregnene-3 - one, M.P. 185–9° C., $$\lambda_{max.}^{MeOH}\ (\text{in base})\ 357\ m\mu,\ E\%\ 240;\ 243\ m\mu,\ E\%\ 363$$

Example 5

A solution of 3.5 g. of 17$\alpha$-tetrahydropyranyloxy-20-hydroxy-2-hydroxymethylene-4-pregnene-3-one and 0.45 ml. of hydrazine hydrate in 30 ml. of ethanol is refluxed under nitrogen for 45 minutes. The solvent is then evaporated under reduced pressure. The residue is flushed with n-hexane and 100 ml. of ether is added. The resulting suspension is shaken thoroughly for several minutes, filtered, and the filtrate evaporated to dryness under reduced pressure, to leave a residue of about 1.6 g. (46%) of 17$\alpha$-tetrahydropyranyloxy-20-hydroxy-4-pregneno-[3,2-c]pyrazole, $$\lambda_{max.}^{MeOH}\ 260\ m\mu,\ E\%\ 201,\ 9,000$$

The ether insoluble fraction shows $$\lambda_{max.}^{MeOH}\ 260\ m\mu,\ E\%\ 159$$

Example 6

To a solution of 0.5 millimole of 17$\alpha$-tetrahydropyranyloxy-20-hydroxy-2-hydroxymethylene-4 - pregnene-3-one in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness, water is added, and the N-methyl-17$\alpha$-tetrahydropyranyloxy-20 - hydroxy - 4 - pregneno-[3,2-c]pyrazole is removed by filtration.

A mixture of the 1′-methyl- and 2′-methyl-17$\alpha$-tetrahydropyranyloxy-20-hydroxy-4-pregneno-[3,2-c]pyrazole is prepared by the following route:

A mixture of 1 gram of 17α-tetrahydropyranyloxy-20-hydroxy-2-hydroxymethylene-4-pregnene-3-one, 200 ml. of methanol, and 200 mg. of p-toluensulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α-tetrahydropyranyloxy-20-hydroxy-2-methoxymethylene-4-pregnene-3-one is obtained by chromatography on acid-washed alumina and elution with ether:chloroform mixtures.

A mixture of 500 mg. of the above 2-methoxymethylene-derivative, 100 ml. of ethanol, and 1 ml. of methylhydrazine is heated under nitrogen until dissolved, and then allowed to stand under nitrogen at room temperature overnight. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to yield the 1'-methyl- and the 2'-methyl-17α-tetrahydropyranlyoxy-20-hydroxy-4-pregneno-[3,2-c]pyrazole.

The N-methyl-17α-tetrahydropyranyloxy-20-hydroxy-4-pregneno-[3,2-c]pyrazole may also be prepared by the following procedure: A solution of about 0.47 millimole of 17α-tetrahydropyranyloxy-20-hydroxy-4-pregneno-[3,2-c]pyrazole, in 10 ml. of benzene is treated with 30–38 mg. of about 51% sodium hydride (in oil suspension) after the addition of 2–3 ml. of dimethyl formamide (dried over calcium hydride) and 5 ml. of methyl iodide, the mixture is stirred at room temperature over night. The product is filtered, washed with methylene chloride, and the filtrate and washings are taken to dryness. The residue is treated with water and the product is filtered to give N-methyl-17α-tetrahydropyranyloxy-20-hydroxy-4-pregneno-[3,2-c]pyrazole.

In accordance with the above procedures, but using other alkylating agents in place of methyl iodide, there is obtained the corresponding N-alkyl-17α-tetrahydropyranyloxy-20-hydroxy-4-pregneno-[3,2-c]pyrazole.

In accordance with all of the above procedures, but starting with the 2-hydroxymethylene derivatives defined by Compound 5 of Flow Sheet A, there are obtained the corresponding 1'-methyl- and 2'-methyl derivatives.

*Example 7*

A mixture of 90 mg. of 17α-tetrahydropyranloxy-20-hydroxy-2-hydroxymethylene-4-pregnene-3-one and 0.028 ml. of phenylhydrazine is refluxed under nitrogen in 1.2 ml. of absolute ethanol for about 50 minutes. The reaction mixture is taken to dryness. Water is added and the product is filtered to give an amorphous solid, which is washed successively with water, dilute acid, water, and petroleum ether. The product is crystallized from methanol to afford a product which is predominately the 2'-phenyl-17α-tetrahydropyranyloxy-20-hydroxy-4-pregneno-[3,2-c]pyrazole.

A mixture of the 1'-phenyl- and 2'-phenyl-17α-tetrahydropyranyloxy-20-hydroxy-4-pregneno-[3,2-c]-pyrazole is prepared by the following route: A mixture of 1 gram of 17α-tetrahydropyranyloxy-20-hydroxy-2-hydroxymethylene-4-pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α-tetrahydropyranyloxy-20-hydroxy-2-methoxymethylene-4-pregnene-3-one is obtained by chromatography on acid-washed alumina and elution with ether:chloroform mixtures.

A mixture of 500 mg. of the above 2-methoxymethylenesteroid, 100 ml. of ethanol, and 1 ml. of phenylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to yield the 1'-phenyl- and 2'-phenyl-17α-tetrahydropyranyloxy-20-hydroxy-4-pregneno-[3,2-c]pyrazole.

In accordance with the above procedures, but starting with the 2-hydroxymethylene-derivative which is obtained from each of the starting materials which are defined by Compound 5 of Flow Sheet A, there are obtained the corresponding 1'-phenyl- and 2'-phenyl-derivatives.

In accordance with the above procedures, but using cyclohexylhydrazine, p-tolylhydrazine, p-chlorophenylhydrazine, p-methoxyphenylhydrazine, or benzylhydrazine in place of phenylhydrazine, there are obtained the corresponding 1'- and 2'-cyclohexyl-, 1'- and 2'-p-tolyl-, 1-, and 2'-p-chlorophenyl-, 1'- and 2₁-p-methoxyphenyl-, and 1'- and 2'-benzyl-17α-tetrahydropyranyloxy-20-hydroxy-4-pregneno-[3,2-c]pyrazoles.

*Example 8*

A 111.5 mg. sample of 17α-tetrahydropyranyloxy-20-hydroxy-2-hydroxymethylene-4-pregnene-3-one is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness in vacuo. The product is dissolved in methanol and then allowed to crystallize slowly to afford a product which is predominantly the 2'-(p-fluorophenyl)-17α-tetrahydropyranyloxy-20-hydroxy-4-pregneno-[3,2-c]pyrazole.

A mixture of 1'-(p-fluorophenyl)- and 2'-(p-fluorophenyl)-17α-tetrahydropyranyloxy-20-oxo-4-pregneno-[3,2-c]pyrazole is prepared by the following route: A mixture of 1 gram of 17α-tetrahydropyranyloxy-20-hydroxy-2-hydroxymethylene-4-pregnene-3-one, 200 ml. of methanol, and 200 mg. of p-toluenesulfonic acid is heated to reflux temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α-tetrahydropyranyloxy-20-hydroxy-2-methoxymethylene-4-pregnene-3-one is obtained by chromatography on acid-washed alumina and elution with ether-chloroform mixtures.

A mixture of 500 mg. of the 2-methoxymethylene-derivative 100 ml. of ethanol, and 1 ml. of p-fluorophenylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extracts are then dried, concentrated, and chromatographed on acid-washed alumina to afford the 1'-(p-fluorophenyl) and 2'-(p-fluorophenyl)-17α-tetra-hydropyranyloxy-20-hydroxy-4-pregneno-[3,2-c]pyrazole.

In accordance with all of the above procedures, but starting with the 2-hydroxymethylene derivative which is obtained from each of the starting materials which are defined by Compound 5 of Flow Sheet A, there are obtained the corresponding 1'-(p-fluorophenyl)- and 2'-(p-fluorophenyl)-derivatives.

Example 9

The 17α-tetrahydropyranyloxy-20-hydroxy-4-pregneno-[3,2-c]pyrazole (326.0 mg.) is dissolved in 32.6 ml. of purified acetone and cooled in an ice bath to 0–5° C. A chromium trioxide-sulfuric acid reagent (0.247 ml.), prepared by dissolving 26.72 g. of chromium trioxide in 23 cc. of concentrated sulfuric acid and then diluting with water to a volume of 100 cc., is added and the mixture is stirred for 40 seconds. Cold 0.1 N sodium hydroxide (20 ml.) is added, followed by 170 ml. of cold water. The mixture is stirred at room temperature for 10 minutes. The product is filtered, washed with water and air-dried for 10 minutes. It is then dissolved in 40 ml. of methanol and filtered. The solvent is removed in vacuo. The residue is then dissolved in 10 ml. of chloroform and the solution is dried over magnesium sulfate, filtered and the solvent removed on a steam bath. On drying 264.7 mg. of residue is obtained. The residue is chromatographed on silica gel. The fractions which have been eluted with 99% chloroform-1% methanol are collected and combined with chloroform. The solvent is removed to give 108.3 mg. of 17α-tetrahydropyranyloxy-20-oxo-4-pregneno-[3,2-c]pyrazole $\lambda_{max}$ 260 m$\mu$, E% 177. The I.R. spectrum shows some 17 carbonyl to be present.

Example 10

The 17α-tetrahydropyranyloxy-20-oxo-4-pregneno-[3,2-c]pyrazole (40.0 mg.) is dissolved in 0.5 ml. of methanol and treated with 1.82 ml. of a solution of 500 mg. of p-toluenesulfonic acid monohydrate in 25 ml. of methanol. The mixture is kept at room temperature for 4 hours. The solvent is removed on a steam bath and the residue is treated with 3 ml. of ethyl acetate. The insoluble material is filtered off and the mother liquor washed twice with 2 ml. of 10% sodium bicarbonate and twice with 2 ml. of water. The product is dried over magnesium sulfate, filtered and the solvent removed on a steam bath. The residue is slurried with a small amount of methylene chloride, and the slurry is filtered and dried in vacuo to give 23.0 mg. of 17α-hydroxy-20-oxo-4-pregneno-[3,2-c]pyrazole $$U.V. \lambda_{max.}^{MeOH} 260 m\mu, E\% 293$$

In accordance with the above procedure, but starting with an N-substituted-17α-tetrahydropyranyloxy-20-oxo-4-pregneno-[3,2-c]pyrazole the corresponding N-substituted-17α-hydroxy-20-oxo-4-pregneno-[3,2-c]pyrazole is obtained.

Example 11

The 17α-hydroxy-20-oxo-4-pregneno-[3,2-c]pyrazole (37.3 mg.) is treated with 3 ml. of acetic anhydride and 1 ml. of a solution of 304 mg. of p-toluenesulfonic acid monohydrate dissolved in 10 ml. of acetic anhydride. The mixture is kept at room temperature for 20 hours. The solvent is removed in vacuo. The residue is dissolved in 1 ml. of ether which has been washed once with 1 ml. of water. The aqueous phase is back-extracted twice with 1 ml. of ether. The combined ethereal extracts are washed once with 2 ml. of 10% sodium bicarbonate solution. The aqueous phase is then back-extracted with 1 ml. of ether. The combined ether extracts are washed with 1 ml. of water. The aqueous extract is back extracted with 1 ml. of ether. The combined ethereal extracts are dried over magnesium sulfate, filtered and the solvent removed on a steam bath to give 42.2 mg. of crude 17α-acetoxy-20-oxo-4-pregneno-[3,2-c]pyrazole N-acetate.

Example 12

The 17α-acetoxy-20-oxo-4-pregneno-[3,2-c]pyrazole N-acetate is dissolved in 3.0 ml. of methanol and treated with 0.13 ml. of 0.1 N sodium hydroxide. The mixture is heated at reflux temperature for 30 minutes. The solvent is removed on a steam bath to give a crude product which is treated with 1 ml. of water and then extracted with 1 ml. of ether. The layers are separated and the aqueous phase is back extracted three times with 1 ml. of ether. The combined ether extracts are washed with 1 ml. of water. The organic phase is dried over magnesium sulfate, filtered and the solvent removed. The product is crystallized from methanol to give 23.0 mg. of 17α-acetoxy-20-oxo-4-pregneno-[3,2-c]pyrazole U.V. $\lambda_{max.}^{MeOH}$ 260.0 mg., E% 236 (9,400) I.R. CHCl$_3$OAc 5.79$\mu$ and NH of pyrazole ring 2.89$\mu$, 3.1, 3.2$\mu$.

Following in sequence the procedures of Examples 1, 2, 3, 4, 5, 9, 10, 11 and 12, but starting in Example 1 with each of the following compounds in place of the 17α-hydroxy-4-pregnene-3,20-dione;
17α-hydroxy-19-nor-4-pregnene,3,20-dione,
17α-hydroxy-6,16α-dimethyl-4,6-pregnadiene-3,20-dione,
17α-hydroxy-4,6-pregnadiene-3,20-dione,
17α-hydroxy-6-chloro-16α-methyl-4,6-pregnadiene-3,20-dione,
17α-hydroxy-6,16β-dimethyl-4,6-pregnadiene-3,20-dione,
17α-hydroxy-6-chloro-4,6-pregnadiene-3,20-dione, there is obtained as a product, the corresponding [3,2-c]-pyrazole, namely:

17α-acetoxy-19-nor-20-oxo-4-pregneno-[3,2-c]pyrazole,
17α-acetoxy-6,16α-dimethyl-20-oxo-4,6-pregnadieno-[3,2-c]pyrazole,
17α-acetoxy-20-oxo-4,6-pregnadieno-[3,2-c]-pyrazole,
17α-acetoxy-6-chloro-16α-methyl-20-oxo-4,6-pregnadieno-[3,2-c]pyrazole,
17α-acetoxy-6,16β-dimethyl-20-oxo-4,6-pregnadieno-[3,2-c]pyrazole,
17α-acetoxy-6-chloro-20-oxo-4,6-pregnadieno-[3,2-c]-pyrazole.

Following in sequence the procedures of Examples 1, 2, 3, 4, 7, 9, 10 and 11, but starting in Example 1 with each of the following compounds in place of the 17α-hydroxy-4-pregnene-3,20-dione;
17α-hydroxy-6α-methyl-4-pregnene-3,20-dione,
17α-hydroxy-6-chloro-16α-methyl-4,6-pregnadiene-3,20-dione,
17α-hydroxy-6,16α-dimethyl-4,6-pregnadiene-3,20-dione,
17α-hydroxy-6-16β-dimethyl-4,6-pregnadiene-3,20-dione,
17α-hydroxy-6-methyl-4,6-pregnadiene-3,20-dione,
17α-hydroxy-6-chloro-4,6-pregnadiene-3,20-dione, there is obtained as a product the corresponding 2'-phenyl-[3,2-c]pyrazole namely:

17α-acetoxy-6α-methyl-20-oxo-2'-phenyl-4-pregneno-[3,2-c]pyrazole,
17α-acetoxy-6-chloro-16α-methyl-20-oxo-2'-phenyl-4,6-pregnadieno-[3,2-c]pyrazole,
17α-acetoxy-6,16α-dimethyl-20-oxo-2'-phenyl-4,6-pregnadieno-[3,2-c]pyrazole,
17α-acetoxy-6,16β-dimethyl-20-oxo-2'-phenyl-4,6-pregnadieno-[3,2-c]-pyrazole,
17α-acetoxy-6-methyl-20-oxo-2'-phenyl-4,6-pregnadieno-[3,2-c]pyrazole,
17α-acetoxy-6-chloro-20-oxo-2'-phenyl-4,6-pregnadieno-[3,2-c]pyrazole.

The 17α-hydroxy-6-chloro-16α-methyl-4,6-pregnadiene-3,20-dione used as starting material can be made by the following procedures:

A solution of 3.25 g. of 17α-hydroxy-16α-methyl-4,6-pregnadiene-3,20-dione in 325 ml. of methylene dichloride is cooled in an ice bath and treated with 75 ml. of 1.5 N ethereal monoperphthalic acid and allowed to stand over night at room temperature. The mixture is poured into excess sodium bicarbonate, and the organic layer is separated and dried. Removal of solvent and crystallization from a suitable solvent affords 6α,7α-epoxy-17α-hydroxy-16α-methyl-4-pregnene-3,20-dione.

6α,7α-epoxy-17α-hydroxy-16α-methyl-4-pregnene-3,20-dione (1.0 g.) in 75 ml. of glacial acetic acid is saturated at room temperature with anhydrous hydrogen chloride and allowed to stand for four hours at room temperature. It is then poured into water, extracted with chloroform, washed with water and sodium bicarbonate. Removal of dried solvent and chromatography on neutral alumina affords 6-chloro-17α-hydroxy-16α-methyl-4,6-pregnadiene-3,20-dione.

*Example 13*

A solution of 1.000 g. of 17α-hydroxy-20-oxo-4-pregneno-[3,2-c]pyrazole in 10 ml. of caproic acid and 2 ml. of trifluoroacetic acid is flushed with argon and heated on a steam bath for 50 minutes. The mixture is then cooled, poured into water and the acid is neutralized with sodium bicarbonate. The product is extracted with methylene chloride. The extract is washed with 5% sodium hydroxide solution and water, dried and concentrated to an oil. The oil is chromatographed on Florisil (an activated magnesium silicate made according to U.S.P. 2,393,625) to obtain the 17α-caproyloxy-20-oxo-4-pregneno-[3,2-c]pyrazole.

Following in sequence the procedures of Examples 1, 2, 3, 4, 5, 9, 10 and 13, but starting with 17α-hydroxy-6,16α-dimethyl-4,6-pregnadiene-3,20-dione there is obtained the 17α-caproyloxy-6,16α-dimethyl-20-oxo-4,6-pregnadieno-[3,2-c]pyrazole.

*Example 14*

To a suspension of 25.0 g. of 17α,21-dihydroxy-16α-methyl-4-pregnene-3,20-dione in 1.5 l. of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paperstrip chromatography but shows two U.V. absorbing spots near the solvent front (methanol-formamide 2:1 vs. benzene-n-hexane 1:1). A 2.425 g. aliquot is recrystallized three times from a mixture of benzene and n-hexene to give 17α,20,20,21-bis(methylenedioxy)-16α-methyl-4-pregnene-3-one which is used in the subsequent step of the synthesis without further purification.

The 17α,20,20,21 - bis(methylenedioxy) - 16α - methyl-4-pregnene-3-one (1.350 g.) is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature over night. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α,20,20,21 - bis(methylenedioxy) - 2 - hydroxymethylene-16α-methyl-4-pregnene-3-one.

The 17α,20,20,21 - bis(methylenedioxy) - 2 - hydroxymethylene-16α-methyl-4-pregnene-3-one (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for 1 hour in high vacuum to give 17α,20,20,21-bis(methylenedioxy)-16α-methyl-4-pregneno-[3,2-c]pyrazole.

The 17α,20,20,21 - bis(methylenedioxy) - 16α - methyl-4-pregneno-[3,2-c]pyrazole (720 mg.) is heated in a steam bath with 24 ml. of a 60% aqueous solution of formic acid for about 30 minutes. The excess reagent is removed in vacuo using a water bath at about 50° C. as the source of heat. The residue is flushed four times with n-hexane and then dried at 60° C. in high vacuum to give an amorphous solid which is a mixture of 17α,21-dihydroxy - 16α - methyl - 20 - oxo - 4 - pregneno-[3,2-c]pyrazole and/or its formylated derivatives. A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 17α,21-dihydroxy-16α-methyl-20-oxo-4-pregneno-[3,2-c]pyrazole.

To a solution of 100 mg. of 17α,21-dihydroxy-16α-methyl-20-oxo-4-pregneno-[3,2-c]pyrazole in 2 ml. of pyridine is added two milliequivalents of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the N-acetyl-17α,21-dihydroxy - 16α - methyl - 20 - oxo - 4 - pregneno-[3,2-c]-pyrazole 21-acetate which is isolated by the addition of water and filtration.

In accordance with the above procedure, but using an equivalent quantity of another acylating agent in place of acetic anhydride, there is obtained the corresponding N - acyl - 17α,21 - dihydroxy - 16α - methyl - 20 - oxo - 4-pregneno-[3,2-c]pyrazole 21-acylate.

A solution of 5.73 g. of N-acetyl-17α,21-dihydroxy-16α-methyl-20-oxo-4-pregneno-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extracts are washed with water and with saturated sodium bicarbonate solution, dried, and evaporated to dryness in vacuo. Recrystallization of the resulting product affords the 17α-21-dihydroxy-16α-methyl-20 - oxo - 4 - pregneno-[3,2-c]pyrazole 21-acetate.

To a solution of 3.70 g. of 17α,21-dihydroxy-16α-methyl-20-oxo-4-pregneno-[3,2-c]pyrazole in 150 ml. of methanol there is added 30 ml. of water containing 0.01 mole of hydrogen chloride. Then a solution of 0.81 g. of potassium cyanate in 8 ml. of water is added and this mixture is left over night at room temperature. Some of the methanol is removed in vacuo on the rotating evaporator; more water is added and the precipitate is collected by filtration. Recrystallization from methanol gives the N-carbamyl pyrazole in sufficient purity for the next step.

To a solution of 85 mg. of N-carbamyl-17α,21-dihydroxy-16α-methyl-20-oxo-4-pregneno-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-carbamyl-17α,21-dihydroxy-16α-methyl-20-oxo-4-pregneno-[3,2-c]pyrazole 21-mesylate.

To a solution of 62 mg. of N-carbamyl-17α,21-dihydroxy-16 -methyl-20-oxo-4-pregneno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-carbamyl-17α,21 - epoxy - 16α - methyl - 20 - oxo - 4 - pregneno-[3,2-c]pyrazole and N-carbamyl-21-fluoro-17α-hydroxy-16α - methyl - 20 - oxo - 4 - pregneno - [3,2 - c]pyrazole, which compounds are separated by partition chromatography, or by chromatography on silica gel.

To a solution of 355 mg. of N-carbamyl-21-fluoro-17α-hydroxy - 16α - methyl-20-oxo-4-pregneno-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 21-fluoro-17α-hydroxy-16α-methyl-20-oxo-4-pregneno-[3,2-c]pyrazole.

To 180 mg. of N-carbamyl-17α, 21-dihydroxy-16α-methyl-20-oxo-4-pregneno[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-carbamyl - 17α-hydroxy - 21 - iodo-16α-methyl-20-oxo-4-pregneno-[3,2-c]pyrazole.

The N - carbamyl-17α-hydroxy-21-iodo-16α-methyl-20-oxo-4-pregneno-[3,2-c]pyrazole is dissolved in a mixture of 5 ml. of water and 5 ml. of ethanol. To the resulting suspension is added 500 mg. of sodium bisulfite and the mixture is heated under reflux for a period of about 1 hour. The reaction solution is cooled, diluted with water, and the material which separates is recovered by filtration. The product is washed with water, dried and recrystallized from ethyl acetate to give N-carbamyl-17α - hydroxy-16α-methyl-20-oxo-4-pregneno-[3,2-c]pyrazole.

To a solution of 355 mg. of N-carbamyl-17α-hydroxy-20-oxo-4-pregneno-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 17α-hydroxy-20-oxo-4-pregneno-[3,2-c]pyrazole.

*Example 15*

To a solution of 0.5 millimole of 17α, 20, 20, 21-bis (methylenedioxy) - 2 - hydroxymethylene-16α-methyl-4-pregnene-3-one in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness, water is added, and the 17α, 20, 20, 21-bis(methylenedioxy-N, 16α-dimethyl-4-pregneno-[3,2-c]pyrazole which is formed as the major component is removed by filtration.

Alternately, a mixture of 1', 16α-dimethyl-, and 2', 16α-dimethyl-17α, 20,20,21-bis(methylenedioxy)-4-pregneno-[3,2-c]pyrazole is prepared by heating 17α, 20,20,21-bis (methylenedioxy) - 2 - hydroxymethylene - 16α-methyl-4-pregnene-3-one with methanol in the presence of p-toluenesulfonic acid to form the 17α,20,20,21-bis(methylenedioxy)-2-methoxymethylene-16α-methyl-4-pregnene-3-one, and then reacting the latter compound with methylhydrazine, following the detailed procedures given in column 24, but using methylhydrazine instead of phenylhydrazine in the second step of the reaction. The components of the mixture are separated by chromatography.

In accordance with all the above procedures, but using other alkyl substituted hydrazines such as ethyl-, β-hydroxyethyl-, propyl-, butylhydrazines, and the like, in place of methylhydrazine, there are obtained the corresponding 1'-alkyl- and 2'-alkyl-17α,20,20,21-bis(methylenedioxy)-16α-methyl-4-pregneno-[3,2-c]pyrazoles.

The 17α,20,20,21-bis(methylenedioxy)-N, 16α-dimethyl enedioxy) - N, 16α-dimethyl-4-pregneno-[3,2-c]pyrazoles may be prepared also by the following procedure:

The 17α,20,20,21 - bis(methylenedioxy) - 2 - hydroxymethylene-16α-methyl-4-pregnene-3-one is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for one hour in high vacuum to give 17α,20,20,21 - bis(methylenedioxy) - 16α - methyl-4-pregneno-[3,2-c]pyrazole.

A solution of about 0.47 millimole of 17α,20,20,21-bis (methylenedioxy) - 16α - methyl-4-pregneno-[3,2 - c]pyrazole in 10 ml. of benzene is treated with about 30-38 mg. of about 51% sodium hydride (in oil suspension). After the addition of 2–3 ml. of dimethylformamide (dried over calcium hydride) and 5 ml. of methyl iodide, the mixture is stirred at room temperature overnight. The product is filtered, washed with methylene chloride, and the filtrate and washings are taken to dryness. The residue is treated with water and the product is filtered to afford as a major component the 17α,20,20,21'-bis(methylenedioxy)-N, 16α-dimethyl-4-pregneno-[3,2-c]pyrazole.

In accordance with the above procedure, but using another alkylating agent, for example, ethyl iodide, propyl iodide and the like, in place of the methyl iodide, there is obtained the corresponding N-alkyl-17α,20,20,21-bis-(methylenedioxy)-16α-methyl-4-pregneno - [3,2-c]pyrazole.

The 17α,20,20,21-bis(methylenedioxy)-2',16α-dimethyl-4-pregneno-[3,2-c]pyrazole (15 mg.) is heated on a steam bath with 1 ml. of 60% formic acid for about 20 minutes and then filtered hot. The filtrate is taken to dryness, water is added, and a mixture of the 17α,21-dihydroxy-2',16α - dimethyl-20-oxo-4-pregneno-[3,2-c]pyrazole and its 21-formate is recovered by filtration. A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 17α,21-dihydroxy-2',16α-dimethyl-20-oxo-4-pregneno-[3,2-c]pyrazole.

To a solution of 100 mg. of 17α,21-dihydroxy-2',16α-dimethyl - 20 - oxo-4-pregneno-[3,2-c]pyrazole in 2 ml. of pyridine is added one milliequivalent of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo. The 17α,21-dihydroxy-2'16α-dimethyl-20-oxo-4-pregneno - [3,2-c]pyrazole 21-acetate is then isolated by addition of water and filtration.

In accordance with the above procedure, but using an equivalent quantity of another acylating agent in place of acetic anhydride, there is obtained the corresponding 17α,21-dihydroxy-2',16α - dimethyl-20-oxo-4 - pregneno-[3,2-c]pyrazole 21-acylate.

To a solution of 85 mg. of 17α,-dihydroxy-2',16α-dimethyl-20-oxo-4-pregneno-[3,2-c]pyrazole in 0.5 ml. of pyridine, cooled to 0° C., is added 0.015 ml. of methane sulfonyl chloride. The resulting mixture is allowed to stand at a temperature of aproximately 0° C. for a period of approximately 1 hour. Water is then added to the reaction mixture and the precipitate which forms is recovered by filtration, washed with water, and dried to give 17α,21 - dihydroxy-2',16α-dimethyl - 20-oxo-4-pregneno[3,2-c]pyrazole 21-mesylate.

To 180 mg. of 17α,21-dihydroxy-2'-16α-dimethyl-20-oxo-4-pregneno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give 17α-hydroxy-21-iodo-2',16α-dimethyl-20-oxo-4-pregneno - [3,2-c]pyrazole.

The 17α - hydroxy-21-iodo-2',16α-dimethyl-20-oxo-4-pregneno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give 17α-hydroxy-2',16α-dimethyl - 20 - oxo-4-pregneno-[3,2-c]pyrazole.

To a solution of 62 mg. of 17α,21-dihydroxy-2',16α-dimethyl-20-oxo-4-pregneno-[3,2-c]pyrazole 21-mesylate in 1 ml. of freshly distilled anhydrous dimethyl-formamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 17α,21-epoxy-2',16α-dimethyl-20-oxo-4-pregneno - [3,2-c]pyrazole and 21-fluoro-17α-hydroxy-2',16α-dimethyl - 20 - oxo-4-pregneno-[3,2 - c]pyrazole, which compounds are separated by partition chromatography, or by chromatography on silica gel.

In accordance with the above procedures beginning with the 2'-methyl-17α,20,20,21-bis(methylenedioxy)-4-pregneno-[3,2-c]pyrazole, but using the 1'-methyl-derivative in place of the 2'-methyl-derivative, there are obtained the corresponding 1'-methyl compounds.

In accordance with all of the above procedures, but starting with the 17α,20,20,21-bis(methylenedioxy)-2-hydroxymethylene-4-pregnene-(or 4,6-pregnadiene) which is obtained from each of the starting materials defined by Compound 3 of Flow Sheet B, there are obtained the corresponding 1'-methyl- and 2'-methyl derivative.

*Example 16*

A mixture of 90 mg. of 17α,20,20,21-bis(methylenedioxy)-2-hydroxymethylene-16α - methyl-4-pregneno-3-one and 0.028 ml. of phenylhydrazine are refluxed under nitrogen in 1.2 ml. of absolute ethanol for 50 minutes. The reaction mixture is taken to dryness. Water is added and the product is filtered to give an amorphous solid, which is washed successively with water, dilute acid, water, and petroleum ether. The product is crystallized from methanol to give 17α,20,20,21-bis(methylenedioxy)-16α-methyl-2'-phenyl-4-pregneno-[3,2-c]pyrazole.

Alternately, a mixture of the 1'-phenyl- and 2'-phenyl-17α,20,20,21-bis(methylenedioxy)-16α-methyl-4-pregneno-[3,2-c]pyrazole is prepared by the following route: A mixture of 1 gram of 17α,20,20,21-bis(methylenedioxy)-2-hydroxymethylene-16α-methyl-4-pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α,20,20,21-bis(methylenedioxy)-2-methoxymethylene-16α-methyl-4-pregnene-3-one is obtained by direct crystallization or by chromatography on acid-washed alumina and elution with ether:chloroform mixtures.

A mixture of 500 mg. of 17α,20,20,21-bis(methylenedioxy)-2-methoxymethylene - 16α - methyl - 4 - pregnene-3-one, 100 ml. of ethanol, and 1 ml. of phenylhydrazine is heated under nitrogen until dissolved, and then allowed to stand under nitrogen at room temperature overnight. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene affords a product which on recrystallization from a mixture of benzene and ethyl acetate affords the 17α,20,20,21-bis(methylenedioxy) - 16α - methyl - 1' - phenyl-4-pregneno-[3,2-c]pyrazole. Further elution with a mixture of 1:1 ether: petroleum ether and crystallization from benzene, affords the 17α,20,20,21-bis(methylenedioxy)-16α-methyl-2'-phenyl-4-pregneno-[3,2-c]pyrazole.

A 30 mg. aliquot of 17α,20,20,21-bis(methylenedioxy)-16α-methyl-2'-phenyl-4-pregneno-[3,2-c]pyrazole is heated on a steam bath with 2 ml. of 60% formic acid for 35 minutes. The solvents are removed in vacuo, water is added and the product is filtered off to give a mixture of 17α,21-dihydroxy-16α-methyl-20-oxo-2'-phenyl-4-pregneno-[3,2-c]pyrazole and its 21-formate. The presence of formate is indicated by infrared absorption at 5.81 and 8.5μ.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for 10 minutes. The alkoxide is neutralized with acetic acid and the mixture is then taken to dryness and flushed with n-hexane. The residue is washed with water, filtered and dried to constant weight to give 17α,21-dihydroxy-16α-methyl-20 - oxo - 2' - phenyl - 4 - pregneno-[3,2-c]pyrazole.

The 17α,21-dihydroxy-16α-methyl-20-oxo-2'-phenyl-4-pregneno-[3,2-c]pyrazole is treated with a mixture of 1.5 ml. of pyridine and 1.5 ml. of acetic anhydride and the mixture is allowed to stand at room temperature over night. The solvents are removed in vacuo, water is added and the 17α,21-dihydroxy-16α-methyl-20-oxo-2'-phenyl-4-pregneno-[3,2-c]pyrazole 21 acetate is removed by filtration. After drying, the compound is dissolved in methylene chloride, a few drops of 2.5 N HCl are added and the mixture is taken to dryness. The resulting 17α,21-dihydroxy-16α-methyl-20-oxo-2'-phenyl-4-pregneno-[3,2-c]pyrazole 21-acetate hydrochloride salt is soluble in methylene chloride and can be crystallized from acetone.

The 17α,21-dihydroxy-16α-methyl-20-oxo-2'-phenyl-4-pregneno-[3,2-c]pyrazole (100 mg.) is dissolved in 1.2 cc. of dimethylformamide. The solution is cooled to 0° C. and 0.07 cc. of methane sulfonyl chloride is added. The mixture is kept at 0° C. for about one hour, 3 cc. of water is added and the product is extracted into 100 cc. of chloroform, washed with water, dried over sodium compounds.

In accordance with all of the above procedures, but starting with the 17α,20,20,21-bis(methylenedioxy)-2-hydroxymethylene-4-pregnene derivative which is obtained from each of the starting materials defined by Compound 3 of Flow Sheet B, there are obtained the corresponding 1'-phenyl- and 2'-phenyl- derivatives.

*Example 17*

A 111.5 mg. sample of 17α,20,20,21-bis(methylenedioxy) - 2 - hydroxymethylene - 16α-methyl-4-pregnene-3-one is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness in vacuo to give a residue which has as its major component the 17α,20,20-21-bis-(methylenedioxy) - 2' - (p - fluorophenyl) - 16α-methyl-4-pregneno-[3,2-c]pyrazole. The latter compound is recovered by dissolving the reaction mixture in methanol and then recrystallizing.

Alternately, a mixture of the 1'-(p-fluorophenyl)- and the 2'-(p-fluorophenyl)-17α,20,20,21-bis(methylenedioxy)-16α-methyl-4-pregneno-[3,2-c]pyrazole is prepared by the following route: A mixture of 1 gram of 17α,20,20,21-bis(methylenedioxy)-2-hydroxymethylene - 16α - methyl-4-pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α,20,20,21-bis(methylenedioxy)-2-methoxymethylene-16α-methyl-4-pregnene-3-one is obtained by direct crystallization or by chromatography on acid-washed alumina and elution with ether:chloroform mixtures.

A mixture of 500 mg. of 17α,20,20,21-bis(methylenedioxy) - 2 - methoxymethylene - 16α - methyl - 4 - pregnene-3-one, 100 ml. of ethanol, and 1 ml. of p-fluorophenylhydrazine is heated under nitrogen until dissolved, and then allowed to stand under nitrogen at room temperature overnight. Acetic acid (2 ml.) is added and the mixture is allowed to stand for another 4 hours. The reaction mixture is then diluted with ethyl acetate, washed two times with 2 N sulfuric acid, two times with 2 N sodium hydroxide, and then two times with water. The ethyl acetate extract is then dried, concentrated, and chromatographed on acid-washed alumina. Elution with benzene affords a product which on recrystallization from a mixture of benzene and ethyl acetate affords the 17α,20,20,21 - bis(methylenedioxy)-16α-methyl-1'-fluorophenyl - 4 - pregneno[3,2-c]pyrazole. Further elution with a mixture of 1:1 ether:petroleum ether, and crystallization from benzene, affords the 17α,20,20,21 - bis(methylenedioxy) - 16α - methyl-2'-(p-fluorophenyl)-4-pregneno-[3,2-c]pyrazole.

A 70 mg. aliquot of 17α,20,20,21-bis(methylenedioxy)-2'-(p-fluorophenyl) - 16α - methyl-4-pregneno-[3,2-c]pyrazole is heated on a steam bath with 2 ml. of a 60% solution of formic acid for 35 minutes. The excess reagent is removed in vacuo using a water bath at about 50° C. The residue is thoroughly washed with water and then dried at 80° C. to give 61.1 mg. of residue. The crude product is dissolved in 3 ml. of spectral grade methanol and allowed to react with 0.5 ml. of a 0.1 N solution of sodium methoxide in methanol at room temperature for 10 minutes. The product is neutralized with acetic acid. The mixture is then taken to dryness and washed thoroughly with water, filtered and dried to constant weight to give 17α,21-dihydroxy-2'-(p-fluorophenyl)-16α-methyl-20-oxo-4-pregneno - [3,2-c]pyrazole.

To a solution of 100 mg. of 17α,21-dihydroxy-2'-(p-fluorophenyl) - 16α - methyl-20-oxo-pregneno - [3,2-c] pyrazole in 2 ml. of pyridine is added one milliequivalent of acetic anhydride. The mixture is allowed to stand over night at room temperature. A mixture of ice and water is then added. After standing for about 30 minutes, the product is extracted with ethyl acetate. The ethyl acetate is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford 17α,21-dihydroxy-2'-(p-fluorophenyl)-16α-methyl-20-oxo-4-pregneno - [3,2-c] pyrazole 21-acetate which is isolated by the addition of water and filtration. After drying, the compound is dissolved in methylene chloride, a few drops of 2.5 N HCl are added and the mixture is taken to dryness. The resulting hydrochloride salt is crystallized from acetone.

In accordance with the above procedure, but using an equivalent quantity of another acylating agent in place of acetic anhydride, there is obtained the corresponding 21-acylate.

To a solution of 85 mg. of 2'-(p-fluorophenyl)-17α,21-dihydroxy-16α-methyl - 20 - oxo-4-pregneno-[3,2-c]pyrazole in 0.5 ml. of pyridine, cooled to 0° C., is added 0.015 ml. of methanesulfonyl chloride. The resulting mixture is allowed to stand at a temperature of approximately 0° C. for a period of approximately 1 hour. Water is then added to the reaction mixture and the crystalline precipitate which forms is recovered by filtration, washed with water, and dried to give 2'-(p-fluorophenyl)-17α,21-dihydroxy - 16α - methyl-20-oxo-4-pregneno-[3,2-c]pyrazole 21-mesylate.

To 180 ml. of 2'-(p-fluorophenyl)-17α,21-dihydroxy-16α-methyl-20-oxo - 4 - pregneno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered by filtration, washed with water, and dried to give 2'-(p-fluorophenyl)-17α,21-iodo-16α-methyl - 20 - oxo-4-pregneno-[3,2-c]pyrazole.

The 2'-(p-fluorophenyl)-17α-hydroxy - 21 - iodo - 16α-methyl-20-oxo-4-pregneno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the crystalline material which separates is recovered by filtration. The product is washed with water, dried and recrystallized from ethyl acetate to give 2'-(p-fluorophenyl) - 17α - hydroxy-16α-methyl-20-oxo-4-pregneno-[3,2-c]pyrazole.

To a solution of 62 mg. of 2'-(p-fluorophenyl)-17α,21-dihydroxy-16α-methyl - 20 - oxo-4-pregneno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 2'-(p-fluorophenyl)-17α,21-epoxy - 16α - methyl-20-oxo-4-pregneno-[3,2-c]pyrazole and 2'-(p-fluorophenyl)-21-fluoro - 17α-hydroxy-16α-methyl - 20 - oxo - 4 - pregneno-[3,2-c]pyrazole which compounds are separated by partition chromatography.

In accordance with the above procedures beginning with the 2'-(p-fluorophenyl)-17α,20,20,21-bis(methylenedioxy)-6α-methyl-4-pregneno-[3,2-c]pyrazole, but using the 1'-(p-fluorophenyl)-derivative in place of the 2'-(p-fluorophenyl)-derivative, there are obtained the corresponding 1'-(p-fluorophenyl)-compounds.

In accordance with all of the above procedures, but starting with the 17α,20,20,21-bis(methylenedioxy)-2-hydroxymethylene-4-pregnene-derivative which is obtained from each of the starting materials defined by Compound 3 of Flow Sheet B, there are obtained the corresponding 1'-(p-fluorophenyl)- and 2'-(p-fluorophenyl)-derivatives.

*Example 18*

A mixture of 500 mg. of 17α-hydroxy-4-pregnene-3,20-dione, 10 ml. of dimethylformamide, 20 ml. of methyl iodide, and 1.5 gms. of silver oxide is stirred at room temperature for 3 days. An additional ½ gm. of silver oxide is added and the mixture is stirred for one day longer. One hundred ml. of chloroform is then added to the reaction mixture which is stirred for one hour and filtered. The filtrate is evaporated to dryness. The residual oil is chromatographed with acid-washed alumina and eluted with mixtures of ether and petroleum ether to give 17α-methoxy-4-pregnene-3,20-dione.

In the manner described above but using ethyl iodide, allyl iodide, or benzyl iodide in place of methyl iodide, the product obtained is 17α-ethoxy-, 17α-allyloxy- or 17α-benzyloxy-4-pregnene-3-one.

*Example 19*

A mixture of 3.6 g. of 17α-methoxy-4-pregnene-3,20-dione, 200 g. of lithium aluminum hydride and 100 ml. of tetrahydrofuran (distilled over lithium aluminum hydride) is stirred under reflux for 1 hour. About 40 ml. of solvent is then distilled, and the mixture is cooled and treated with ethyl acetate to destroy the excess sodium hydride. With continued stirring, saturated salt solution is added in small portions until a granular deposit of salt is formed. The mixture is filtered, and the filtrate is concentrated under reduced pressure to give 17α-methoxy-4-pregnene-ξ3,20-diol.

*Example 20*

The 17α-methoxy-4-pregnene-ξ3,20-diol is dissolved in 40 ml. of acetone and 30 g. of activated manganese dioxide is added. The mixture is stirred for 18 hours at room temperature, filtered through infursorial earth (Celite) and the manganese dioxide is washed thoroughly with methylene chloride. The combined filtrates are concentrated under reduced pressure. The residue is dissolved in ether and chromatographed on basic alumina. The column is washed with ether until the eluate is free of residue, and then the product is eluted with chloroform-ether 1:9. Evaporation of the solvent leaves 20-hydroxy-17α-methoxy-4-pregnene-3-one.

*Example 21*

Ethyl formate (1.5 ml.) is added to a solution of 1.63 g. of 20-hydroxy-17α-methoxy-4-pregnene-3-one in 35 ml. of dry benzene, and the system is flushed with dry nitrogen. Sodium hydride (1.5 g. as a 53% oil dispersion) is added, and after flushing again with nitrogen, the mixture is stirred for 2 hours at room temperature. After cooling, 30 ml. of ether and 30 ml. of a saturated solution of sodium dihydrogen phosphate solution are added, and the mixture is shaken for about 5 minutes. The layers are separated, the water layer is washed with ether, and the combined ether extracts are washed with saturated salt solution. The product is then extracted with six 15 ml. portions of 2% sodium hydroxide solution, and the combined basic extracts are washed three times with ether. The alkaline solution is acidified to a pH of 6 using saturated sodium dihydrogen phosphate solution, and then extracted several times with ether. After washing the combined ether extracts with saturated salt solution and then drying over sodium sulfate, partial evaporation of solvent gives a crude, crystalline product. The mother liquor is evaporated to dryness and the residue is dissolved in 2 ml. of ether to afford a second crop of 20-hydroxy-2-hydroxymethylene-17α-methoxy-4-pregnene-3-one.

*Example 22*

A solution of 3.5 g. of non-crystalline 20-hydroxy-2-hydroxymethylene17α-methoxy-4-pregnene-3-one and 0.45 ml. of hydrazine hydrate in 30 ml. of ethanol is refluxed under nitrogen for 45 minutes. The solvent is then evaporated under reduced pressure. The residue is flushed with n-hexane and 100 ml. of ether is added. The resulting suspension is shaken thoroughly for several minutes, filtered, and the filtrate evaporated to dryness under reduced pressure, to leave a residue of 20-hydroxy-17α-methoxy-4-pregneno-[3,2-c]pyrazole.

*Example 23*

The 20 - hydroxy-17α-methoxy-4-pregneno-[3,2-c]pyrazole (326 mg.) is dissolved in 32.6 ml. of purified acetone and cooled in an ice bath to 0.5° C. A chromium trioxide-sulfuric acid reagent (0.247 ml.) prepared by dissolving 26.72 g. of chromium trioxide in 23 cc. of concentrated sulfuric acid and then diluting with water to a volue of 100 cc. is added and the mixture is stirred for 40 seconds. Cold 0.1 N sodium hydroxide (20 ml.) is added, followed by 170 ml. of cold water. The mixture is stirred at room temperature for 10 minutes. The product is filtered, washed with water and air-dried for 10 minutes. It is then dissolved in 40 ml. of methanol and filtered. The solvent is removed in vacuo. The residue is then dissolved in 10 ml. of chloroform and the solution is dried over magnesium sulfate, filtered and the solvent removed on steam bath. On drying, a residue is obtained. This is chromatographed on silica gel to give 17α-methoxy-20-oxo-4-pregneno-[3,2-c]pyrazole.

*Example 24*

To a solution of 0.5 millimole of 20-hydroxy-2-hydroxymethylene-17α-methoxy-4-pregnene-3-one in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness, water is added and the 20-hydroxy-N-methyl-17α-methoxy-4-pregneno-[3,2-c]pyrazole is removed by filtration.

A mixture of the 1'-methyl- and 2'-methyl-20-hydroxy-17α-methoxy-4-pregneno-[3,2-c]pyrazole is prepared by the following route: A mixture of 1 gram of 20-hydroxy-2-hydroxymethylene-17α-methoxy-4-pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate.

The ethyl acetate extract is washed two times with 2 N aqueous sodium hydroxide solution and then with water. The ethyl acetate extract is then dried and concentrated in vacuo. The 20-hydroxy-17α-methoxy-2-methoxymethylene-4-pregnene-3-one is obtained by chromatography on acid-washed alumina and elution with ether:chloroform mixtures.

A mixture of 500 mg. of the above 2-methoxymethylene-derivative, 100 ml. of ethanol, and 1 ml. of methylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to offord the 1'-methyl- and the 2'-methyl-20-hydroxy-17α-methoxy-4-pregneno-[3,2-c]pyrazole.

Alternately, the 20-hydroxy-N-methyl-17α-methoxy-4-pregneno-[3,2-c]pyrazoles may be prepared by the following procedure: A solution of about 0.47 millimole of 20-hydroxy-17α-methoxy-4-pregneno-[3,2-c]pyrazole in 10 ml. of benzene and about 30–38 mg. of about 51% sodium hydride (in oil suspension) after the addition of 2–3 ml. of dimethylformamide (dried over calcium hydride) and 5 ml. of methyl iodide, the mixture is stirred at room temperature over night. The product is filtered, washed with methylene chloride, and the filtrate and washings are taken to dryness. The residue is treated with water and the product is filtered to give 20-hydroxy-N-methyl-17α-methoxy-4-pregneno-[3,2-c]pyrazole.

In accordance with the above procedures, but using other alkylating agents in place of methyl iodide, there is obtained the corresponding N-alkyl-20-hydroxy-17α-methoxy-4-pregneno-[3,2-c]pyrazole.

In accordance with all of the above procedures, but starting with the 2-hydroxymethylene derivatives defined by Compound 5 of Flow Sheet A, there are obtained the corresponding 1'-methyl- and 2'-methyl-derivatives.

*Example 25*

A mixture of 90 mg. of 20-hydroxy-2-hydroxymethylene-17α-methoxy-4-pregnene-3-one, and 0.028 ml. of phenylhydrazine are refluxed under nitrogen in 1.2 ml. of absolute ethanol for about 50 minutes. The reaction mixture is taken to dryness. Water is added and the product is filtered to give an amorphous solid, which is washed successively with water, dilute acid, water, and petroleum ether. The product is crystallized from methanol to afford a product which is predominantly the 20-hydroxy - 17α - methoxy-2'-phenyl-4-pregneno-[3,2 - c]-pyrazole.

A mixture of 1'-phenyl- and 2'-phenyl-20-hydroxy-17α-methoxy-4-pregneno-[3,2-c]pyrazole is obtained by the following route: A mixture of 1 gram of 20-hydroxy-2-hydroxymethylene-17α-methoxy-4-pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water.

The ethyl acetate extract is then dried and concentrated in vacuo. The 20-hydroxy-2-methoxymethylene-17α-methoxy-4-pregnene-3-one is obtained by chromatography on acid-washed alumina and elution with ether:chloroform mixtures.

A mixture of 500 mg. of the above 2-methoxy-methylene-derivative, 100 ml. of ethanol, and 1 ml. of phenylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to afford the 1'-phenyl- and 2'-phenyl-20-hydroxy-17α-methoxy-4-pregneno-[3,2-c]pyrazole.

In accordance with the above procedures, but starting with the 2-hydroxymethylene-derivative which is obtained from each of the starting materials defined by Compound 5 of Flow Sheet A, there are obtained the corresponding 1'-phenyl- and 2-phenyl derivatives.

In accordance with the above procedures, but using other arylhydrazines, for example, p-nitrophenyl-, p-methoxyphenylhydrazine, 1-hydrazinonaphthalene, 2-, 3-, or 4-hydrazinopyridine, 4-hydrazinopyridine oxide or 2-hydrazinopyrimidine, or the like, in place of phenylhydrazine, there it obtained the corresponding 1'-aryl- and 2'-aryl-17α-methoxy-20-hydroxy-4-pregneno-[3,2-c]pyrazole.

*Example 26*

A 111.5 mg. sample of 20-hydroxy-2-hydroxymethylene-17α-methoxy-4-pregnene-3-one is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness in vacuo. The product is dissolved in methanol and then allowed to crystallize slowly to afford a product which is predominantly the 2'-(p-fluorophenyl)-20-hydroxy-17α-methoxy-4-pregneno-[3,2-c]pyrazole.

A mixture of 1'-(p-fluorophenyl)- and 2'-(p-fluorophenyl)-20-hydroxy-17α-methoxy-4 - pregneno - [3,2-c]-pyrazole is prepared by the following route: A mixture of 1 gram of 20-hydroxy-2-hydroxymethylene-17α-methoxy-4-pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 20-hydroxy-17α-methoxy-2-methoxymethylene-4-pregnene-3-one is obtained by chromatography on acid-washed alumina and elution with ether:chloroform mixtures.

A mixture of 500 mg. of the 2-methoxymethylene-derivative, 100 ml. of ethanol, and 1 ml. of p-fluorophenylhydrazine is heated under nitrogen until dissolved, and then allowed to stand under nitrogen at room temperature over night. Acetic acid (2 ml.) is added and the mixture is allowed to stand for another four hours. The reaction mixture is then diluted with ethyl acetate, washed two times with 2 N sulfuric acid, two times with 2.5 N sodium hydroxide, and then two times with water. The ethyl acetate extracts are then dried concentrated, and chromatographed on acid-washed alumina to afford the 1'-(p-fluorophenyl)- and 2'-(p-fluorophenyl)-20-hydroxy-17α-methoxy-4-pregneno-[3,2-c]pyrazole.

In accordance with all of the above procedures, but starting with the 2-hydroxymethylene-derivative defined by Compound 5 of Flow Sheet A, there are obtained the corresponding 1'-(p-fluorophenyl)- and 2'-(p-fluorophenyl)-derivatives.

*Example 27*

The 20-hydroxy-17α-methoxy-2'-phenyl-4-pregneno-[3,2-c]pyrazole (326.0 mg.) is dissolved in 32.6 ml. of purified acetone and cooled in an ice bath to 0–5° C.

A chromium trioxide-sulfuric acid reagent (0.247 ml.) prepared by dissolving 26.72 g. of chromium trioxide in 23 cc. of concentrated sulfuric acid and then diluting with water to a volume of 100 cc. is added and the mixture is stirred for 40 seconds. Cold 0.1 N sodium hydroxide (20 ml.) is added, followed by 170 ml. of cold water. The mixture is stirred at room temperature for 10 minutes. The product is filtered, washed with water and air-dried for 10 minutes. It is then dissolved in 40 ml. of methanol and filtered. The solvent is removed in vacuo. The residue is then dissolved in 10 ml. chloroform and the solution is dried over magnesium sulfate, filtered and the solvent removed on steam bath. On drying a residue is obtained which is chromatographed on silica gel to give 17α-methoxy-20-oxo2'-phenyl - 4 - pregneno - [3,2-c]-pyrazole.

In accordance with the above procedure, but starting with the 20-hydroxy-17α-methoxy-2'-(p-fluorophenyl)-4-pregneno-[3,2-c]pyrazole, there is obtained the 17α-methoxy-20-oxo-2' - (p-fluorophenyl) - 4 - pregneno - [3,2-c]-pyrazole.

Following the procedures of Examples 18, 19, 20, 21, 23, 25 and 27, but starting in Example 18 with the 17α-hydroxy - 6,16α-dimethyl-20-oxo-4,6-pregnadiene-[3,2-c]-pyrazole there is obtained the 17α-methoxy-6,16α-dimethyl-20-oxo-2'-phenyl-4,6-pregnadieno-[3,2-c]pyrazole.

In accordance with all of the procedures of Examples 1 to 17, but starting in Example 1 with each of the starting materials defined by Compound 1 of Flow Sheet A and Compound 1 of Flow Sheet B, there are obtained the 17α-hydroxy-20-oxo-4-pregneno-[3,2-c]pyrazoles and the 17α-acyloxy-derivatives thereof, as well as the N-alkyl-, N-cycloalkyl-, N-aryl-, N-aralkyl- and N-heterocyclic derivatives, and the Δ⁴,⁶-analogs of all of the aforesaid [3,2-c]pyrazole compounds.

There are likewise obtained the 17α,21-dihydroxy-20-oxo-4-pregneno-[3,2-c]pyrazoles and the 21-fluoro-17α-hydroxy-20-oxo-4-pregneno-[3,2-c]pyrazoles as well as the 17α- and the 21-acyloxy-derivatives thereof. The N-alkyl-, N-cycloalkyl-, N-aryl-, N-aralkyl-, and N-heterocyclic derivatives are likewise produced as well as the Δ⁴,⁶-analogs of all of the aforesaid [3,2-c]pyrazole compounds.

In accordance with all of the procedures of Example 18 to Example 25, but starting in Example 18 with each of the starting materials defined by Compound 1 of Flow Sheet A and reacting with an alkyl, aralkyl or alkenyl halide to form Compound 2, the corresponding 17α-alkyl-, 17α-aralkyl- or 17α-alkenyl-ethers of the 17α-hydroxy-20-oxo-4-pregneno-(or 4,6-pregnadieno)-[3,2-c]pyrazoles are formed, as well as the N-alkyl-, N-cycloalkyl-, N-aryl-, N-aralkyl- and N-heterocyclic derivatives thereof.

Among the compounds of our invention are included:

17α-hydroxy-20-oxo-4-pregneno-[3,2-c]pyrazole,
6α-chloro-17α-hydroxy-20-oxo-4-pregneno-[3,2-c]pyrazole,
6α-fluoro-17α-hydroxy-20-oxo-4-pregneno-[3,2-c]pyrazole,
17α-hydroxy-6α-methyl-20-oxo-4-pregneno-[3,2-c]pyrazole,
17α-hydroxy-16α-methyl-20-oxo-4-pregneno-[3,2-c]pyrazole,
17α-hydroxy-16β-methyl-20-oxo-4-pregneno-[3,2-c]pyrazole,
17α-hydroxy-16-methylene-20-oxo-4-pregneno-[3,2-c]pyrazole,
17α-acetoxy-20-oxo-4-pregneno-[3,2-c]pyrazole,
17α-acetoxy-6α-chloro-20-oxo-4-pregneno-[3,2-c]pyrazole,
17α-acetoxy-6α-fluoro-20-oxo-4-pregneno-[3,2-c]pyrazole,
17α-acetoxy-6α-methyl-20-oxo-4-pregneno-[3,2-c]pyrazole,
17α-acetoxy-16α-methyl-20-oxo-4-pregneno-[3,2-c]pyrazole,
17α-acetoxy-16β-methyl-20-oxo-4-pregneno-[3,2-c]pyrazole,
17α-acetoxy-16-methylene-20-oxo-4-pregneno-[3,2-c]pyrazole,
17α-acetoxy-6α-chloro-16α-methyl-20-oxo-4-pregneno-[3,2-c]pyrazole,
17α-acetoxy-6α-chloro-16β-methyl-20-oxo-4-pregneno-[3,2-c]pyrazole,
17α-acetoxy-6α-chloro-16-methylene-20-oxo-4-pregneno-[3,2-c]pyrazole,
17α-acetoxy-6α-fluoro-16α-methyl-20-oxo-4-pregneno-[3,2-c]pyrazole,
17α-acetoxy-6α-fluoro-16β-methyl-20-oxo-4-pregneno-[3,2-c]pyrazole,
17α-acetoxy-6α-fluoro-16-methylene-20-oxo-4-pregneno-[3,2-c]pyrazole,
17α-acetoxy-6α,16α-dimethyl-20-oxo-4-pregneno-[3,2-c]pyrazole,
17α-acetoxy-6α,16β-dimethyl-20-oxo-4-pregneno-[3,2-c]pyrazole,
17α-acetoxy-6α-methyl-16-methylene-20-oxo-4-pregneno-[3,2-c]pyrazole,
17α-acetoxy-6α,21-difluoro-20-oxo-4-pregneno-[3,2-c]pyrazole,
17α-acetoxy-21-fluoro-6α,16α-dimethyl-20-oxo-4-pregneno-[3,2-c]pyrazole,
17α-hydroxy-20-oxo-2'-phenyl-4-pregneno-[3,2-c]-pyrazole,
6α-chloro-17α-hydroxy-20-oxo-2'-phenyl-4-pregneno-[3,2-c]pyrazole,
6α-fluoro-17α-hydroxy-20-oxo-2'-phenyl-4-pregneno-[3,2-c]pyrazole,
17α-hydroxy-6α-methyl-20-oxo-2'-phenyl-4-pregneno-[3,2-c]pyrazole,
17α-hydroxy-16α-methyl-20-oxo-2'-phenyl-4-pregneno-[3,2-c]pyrazole,
17α-hydroxy-16β-methyl-20-oxo-2'-phenyl-4-pregneno-[3,2-c]pyrazole,
17α-hydroxy-16-methylene-20-oxo-2'-phenyl-4-pregneno-[3,2-c]pyrazole,
17α-acetoxy-20-oxo-2'-phenyl-4-pregneno-[3,2-c]pyrazole,
17α-acetoxy-6α-chloro-20-oxo-2'-phenyl-4-pregneno-[3,2-c]pyrazole,
17α-acetoxy-6α-fluoro-20-oxo-2'-phenyl-4-pregneno-[3,2-c]pyrazole,
17α-acetoxy-6α-methyl-20-oxo-2'-phenyl-4-pregneno-[3,2-c]pyrazole,
17α-acetoxy-16α-methyl-20-oxo-2'-phenyl-4-pregneno-[3,2-c]pyrazole,
17α-acetoxy-16β-methyl-20-oxo-2'-phenyl-4-pregneno-[3,2-c]pyrazole,
17α-acetoxy-16-methylene-20-oxo-2'-phenyl-4-pregneno-[3,2-c]pyrazole,
17α-acetoxy-6α-chloro-16α-methyl-20-oxo-2'-phenyl-4-pregneno-[3,2-c]pyrazole,
17α-acetoxy-6α-chloro-16β-methyl-20-oxo-2'-phenyl-4-pregneno-[3,2-c]pyrazole,
17α-acetoxy-6α-chloro-16-methylene-20-oxo-2'-phenyl-4-pregneno-[3,2-c]pyrazole,
17α-acetoxy-6α-fluoro-16α-methyl-20-oxo-2'-phenyl-4-pregneno-[3,2-c]pyrazole,
17α-acetoxy-6α-fluoro-16β-methyl-20-oxo-2'-phenyl-4-pregneno-[3,2-c]pyrazole,
17α-acetoxy-6α-fluoro-16-methylene-20-oxo-2'-phenyl-4-pregneno-[3,2-c]pyrazole,
17α-acetoxy-6α,16α-dimethyl-20-oxo-2'-phenyl-4-pregneno-[3,2-c]pyrazole,
17α-acetoxy-6α,16β-dimethyl-20-oxo-2'-phenyl-4-pregneno-[3,2-c]pyrazole,
17α-acetoxy-6α-methyl-16-methylene-20-oxo-2'-phenyl-4-pregneno-[3,2-c]pyrazole,
17α-acetoxy-6α,21-difluoro-20-oxo-2'-phenyl-4-pregneno-[3,2-c]pyrazole,
17α-acetoxy-21-fluoro-6α,16α-dimethyl-20-oxo-2'-phenyl-4-pregneno-[3,2-c]pyrazole, 17α-hydroxy-20-oxo-2'-(p-fluorophenyl)-4-pregneno-[3,2-c]pyrazole,
6α-chloro-17α-hydroxy-20-oxo-2'-(p-fluorophenyl)-4-pregneno-[3,2-c]pyrazole,
6α-fluoro-17α-hydroxy-20-oxo-2'-(p-fluorophenyl)-4-pregneno-[3,2-c]pyrazole,
17α-hydroxy-6α-methyl-20-oxo-2'-(p-fluorophenyl)-4-pregneno-[3,2-c]pyrazole,
17α-hydroxy-16α-methyl-20-oxo-2'-(p-fluorophenyl)-4-pregneno-[3,2-c]pyrazole,
17α-hydroxy-16β-methyl-20-oxo-2'-(p-fluorophenyl)-4-pregneno-[3,2-c]pyrazole,
17α-hydroxy-16-methylene-20-oxo-2'-(p-fluorophenyl)-4-pregneno-[3,2-c]pyrazole,
17α-acetoxy-20-oxo-2'-(p-fluorophenyl)-4-pregneno-[3,2-c]pyrazole,
17α-acetoxy-6α-chloro-20-oxo-2'-(p-fluorophenyl)-4-pregneno-[3,2-c]pyrazole,
17α-acetoxy-6α-fluoro-20-oxo-2'-(p-fluorophenyl)-4-pregneno-[3,2-c]pyrazole,
17α-acetoxy-6α-methyl-20-oxo-2'-(p-fluorophenyl)-4-pregneno-[3,2-c]pyrazole,
17α-acetoxy-16α-methyl-20-oxo-2'-(o-fluorophenyl)-4-pregneno-[3,2-c]pyrazole,
17α-acetoxy-16β-methyl-20-oxo-2'-(p-fluorophenyl)-4-pregneno-[3,2-c]pyrazole,
17α-acetoxy-16-methylene-20-oxo-2'-(p-fluorophenyl)-4-pregneno-[3,2-c]pyrazole,
17α-acetoxy-6α-chloro-16α-methyl-20-oxo-2'-(p-fluorophenyl)-4-pregneno-[3,2-c]pyrazole,
17α-acetoxy-6α-chloro-16β-methyl-20-oxo-2'-(p-fluorophenyl)-4-pregneno-[3,2-c]pyrazole,
17α-acetoxy-6α-chloro-16-methylene-20-oxo-2'-(p-fluorophenyl)-4-pregneno-[3,2-c]pyrazole,
17α-acetoxy-6α-fluoro-16α-methyl-20-oxo-2'-(p-fluorophenyl)-4-pregneno-[3,2-c]pyrazole,
17α-acetoxy-6α-fluoro-16β-methyl-20-oxo-2'-(p-fluorophenyl)-4-pregneno-[3,2-c]pyrazole,
17α-acetoxy-6α-fluoro-16-methylene-20-oxo-2'-(p-fluorophenyl)-4-pregneno-[3,2-c]pyrazole,
17α-acetoxy-6α,16α-dimethyl-20-oxo-2'-(p-fluorophenyl)-4-pregneno-[3,2-c]pyrazole,
17α-acetoxy-6α,16β-dimethyl-20-oxo-2'-(p-fluorophenyl)-4-pregneno-[3,2-c]pyrazole,
17α-acetoxy-6α-methyl-16-methylene-20-oxo-2'-(p-fluorophenyl)-4-pregneno-[3,2-c]pyrazole,
17α-acetoxy-6α,21-difluoro-20-oxo-2'-(p-fluorophenyl)-4-pregneno-[3,2-c]pyrazole,
17α-acetoxy-21-fluoro-6α,16α-dimethyl-20-oxo-2'-(p-fluorophenyl)-4-pregneno-[3,2-c]pyrazole,
17α-caproyloxy-20-oxo-4-pregneno-[3,2-c]pyrazole,
17α-caproyloxy-6α-chloro-20-oxo-4-pregneno-[3,2-c]pyrazole,
17α-caproyloxy-6α-fluoro-20-oxo-4-pregneno-[3,2-c]pyrazole,
17α-caproyloxy-6α-methyl-20-oxo-4-pregneno-(3,2-c]pyrazole,
17α-caproyloxy-6α,16α-dimethyl-20-oxo-4-pregneno-[3,2-c]pyrazole,
17α-acetoxy-20-oxo-19-nor-4-pregneno-[3,2-c]pyrazole,
17α-acetoxy-6α-chloro-20-oxo-19-nor-4-pregneno-[3,2-c]pyrazole,
17α-acetoxy-6α-fluoro-20-oxo-19-nor-4-pregneno-[3,2-c]pyrazole,
17α-acetoxy-6α-methyl-20-oxo-19-nor-4-pregneno-[3,2-c]pyrazole,
17α-acetoxy-6α,16α-dimethyl-20-oxo-19-nor-4-pregneno-[3,2-c]pyrazole,
17α-methoxy-20-oxo-4-pregneno-[3,2-c]pyrazole,
6α-chloro-17α-methoxy-20-oxo-4-pregneno-[3,2-c]pyrazole,
6α-fluoro-17α-methoxy-20-oxo-4-pregneno-[3,2-c]pyrazole,
17α-methoxy-6α-methyl-20-oxo-4-pregneno-[3,2-c]pyrazole,
17α-methoxy-6α,16α-dimethyl-20-oxo-4-pregneno-[3,2-c]pyrazole,
17α-hydroxy-20-oxo-4,6-pregnadieno-[3,2-c]pyrazole,
6-chloro-17α-hydroxy-20-oxo-4,6-pregnadieno-[3,2-c]pyrazole,
6-fluoro-17α-hydroxy-20-oxo-4,6-pregnadieno-[3,2-c]pyrazole,
17α-hydroxy-6-methyl-20-oxo-4,6-pregnadieno-[3,2-c]pyrazole,
17α-hydroxy-16α-methyl-20-oxo-4,6-pregnadieno-[3,2-c]pyrazole,
17α-hydroxy-16β-methyl-20-oxo-4,6-pregnadieno-[3,2-c]pyrazole,
17α-hydroxy-16-methylene-20-oxo-4,6-pregnadieno-[3,2-c]pyrazole,
17α-acetoxy-6-chloro-20-oxo-4,6-pregnadieno-[3,2-c]pyrazole,
17α-acetoxy-6-fluoro-20-oxo-4,6-pregnadieno-[3,2-c]pyrazole,
17α-acetoxy-6-methyl-20-oxo-4,6-pregnadieno-[3,2-c]pyrazole,
17α-acetoxy-16β-methyl-20-oxo-4,6-pregnadieno-[3,2-c]pyrazole,
17α-acetoxy-16β-methyl-20-oxo-4,6-pregnadieno-[3,2-c]pyrazole,
17α-acetoxy-16-methylene-20-oxo-4,6-pregnadieno-[3,2-c]pyrazole,
17α-acetoxy-6-chloro-16α-methyl-20-oxo-4,6-pregnadieno-[3,2-c]pyrazole,
17α-acetoxy-6-chloro-16β-methyl-20-oxo-4,6-pregnadieno-[3,2-c]pyrazole,
17α-acetoxy-6-chloro-16-methylene-20-oxo-4,6-pregnadieno-[3,2-c]pyrazole,
17α-acetoxy-6-fluoro-16α-methyl-20-oxo-4,6-pregnadieno-[3,2-c]pyrazole,
17α-acetoxy-6-fluoro-16β-methyl-20-oxo-4,6-pregnadieno-[3,2-c]pyrazole,
17α-acetoxy-6-fluoro-16-methylene-20-oxo-4,6-pregnadieno-[3,2-c]pyrazole,
17α-acetoxy-6,16α-dimethyl-20-oxo-4,6-pregnadieno-[3,2-c]pyrazole,
17α-acetoxy-6,16β-dimethyl-20-oxo-4,6-pregnadieno-[3,2-c]pyrazole,
17α-acetoxy-6-methyl-16-methylene-20-oxo-4,6-pregnadieno-[3,2-c]pyrazole,
17α-acetoxy-6,21-difluoro-20-oxo-4,6-pregnadieno-[3,2-c]pyrazole,
17α-acetoxy-21-fluoro-6,16α-dimethyl-20-oxo-4,6-pregnadieno-[3,2-c]pyrazole,
6-chloro-17α-hydroxy-20-oxo-2'-phenyl4,6-pregnadieno-[3,2-c]pyrazole,
6-fluoro-17α-hydroxy-20-oxo-2'-phenyl-4,6-pregnadieno-[3,2-c]pyrazole,
17α-hydroxy-6-methyl-20-oxo-2'-phenyl-4,6-pregnadieno-[3,2-c]pyrazole,
17α-hydroxy-16α-methyl-20-oxo-2'-phenyl-4,6-pregnadieno-[3,2-c]pyrazole,
17α-hydroxy-16β-methyl-20-oxo-2'-phenyl-4,6-pregnadieno-[3,2-c]pyrazole,
17α-hydroxy-16-methylene-20-oxo-2'-phenyl-4,6-pregnadieno-[3,2-c]pyrazole,
17α-acetoxy-20-oxo-2'-phenyl-4,6-pregnadieno-[3,2-c]pyrazole,
17α-acetoxy-6-chloro-20-oxo-2'-phenyl-4,6-pregnadieno-[3,2-c]pyrazole,
17α-acetoxy-6-fluoro-20-oxo-2'-phenyl-4,6-pregnadieno-[3,2-c]pyrazole,
17α-acetoxy-6-methyl-20-oxo-2'-phenyl-4,6-pregnadieno-[3,2-c]pyrazole,
17α-acetoxy-16α-methyl-20-oxo-2'-phenyl-4,6-pregnadieno-[3,2-c]pyrazole,
17α-acetoxy-16β-methyl-20-oxo-2'-phenyl-4,6-pregnadieno-[3,2-c]pyrazole,
17α-acetoxy-16-methylene-20-oxo-2'-phenyl-4,6-pregnadieno-[3,2-c]pyrazole, 17α-acetoxy-6-chloro-16α-methyl-20-oxo-2'-phenyl-4,6-pregnadieno-[3,2-c]pyrazole,
17α-acetoxy-6-chloro-16β-methyl-20-oxo-2'-phenyl-4,6-pregnadieno-17α-hydroxy-20-oxo-2'-phenyl-4,6-pregnadieno-[3,2-c]pyrazole,
17α-acetoxy-6-chloro-16-methylene-20-oxo-2'-phenyl-4,6-pregnadieno-[3,2-c]pyrazole,
17α-acetoxy-6-fluoro-16α-methyl-20-oxo-2'-phenyl-4,6-pregnadieno-[3,2-c]pyrazole,
17α-acetoxy-6-fluoro-16β-methyl-20-oxo-2'-phenyl-4,6-pregnadieno-[3,2-c]pyrazole,
17α-acetoxy-6-fluoro-16-methylene-20-oxo-2'-phenyl-4,6-pregnadieno-[3,2-c]pyrazole,
17α-acetoxy-6,16α-dimethyl-20-oxo-2'-phenyl-4,6-pregnadieno-[3,2-c]pyrazole,
17α-acetoxy-6,16β-dimethyl-20-oxo-2'-phenyl-4,6-pregnadieno-[3,2-c]pyrazole,
17α-acetoxy-6-methyl-16-methylene-20-oxo-2'-phenyl-4,6-pregnadieno-[3,2-c]pyrazole,
17α-acetoxy-6,21-difluoro-20-oxo-2'-phenyl-4,6-pregnadieno-[3,2-c]pyrazole,
17α-acetoxy-21-fluoro-6,16α-dimethyl-20-oxo-2'-phenyl-4,6-pregnadieno-[3,2-c]pyrazole,
17α-hydroxy-20-oxo-2'-(p-fluorophenyl)-4,6-pregnadieno-[3,2-c]pyrazole,
6-chloro-17α-hydroxy-20-oxo-2'-(p-fluorophenyl)-4,6-pregnadieno-[3,2-c]pyrazole,
6-fluoro-17α-hydroxy-20-oxo-2'-(p-fluorophenyl)-4,6-pregnadieno-[3,2-c]pyrazole,
17α-hydroxy-6-methyl-20-oxo-2'-(p-fluorophenyl)-4,6-pregnadieno-[3,2-c]pyrazole,
17α-hydroxy-16α-methyl-20-oxo-2'-(p-fluorophenyl)-4,6-pregnadieno-[3,2-c]pyrazole,
17α-hydroxy-16β-methyl-20-oxo-2'-(p-fluorophenyl)-,4,6-pregnadieno-[3,2-c]pyrazole,
17α-hydroxy-16-methylene-20-oxo-2'-(p-fluorophenyl)-4,6-pregnadieno-[3,2-c]pyrazole,
17α-acetoxy-20-oxo-2'-(p-fluorophenyl)-4,6-pregnadieno-[3,2-c]pyrazole,
17α-acetoxy-6-chloro-20-oxo-2'-(p-fluorophenyl)-4,6-pregnadieno-[3,2-c]pyrazole,
17α-acetoxy-6-fluoro-20-oxo-2'-(p-fluorophenyl)-4,6-pregnadieno-[3,2-c]pyrazole,
17α-acetoxy-6-methyl-20-oxo-2'-(p-fluorophenyl)-4,6-pregnadieno-[3,2-c]pyrazole,
17α-acetoxy-16α-methyl-20-oxo-2'-(p-fluorophenyl)-4,6-pregnadieno-[3,2-c]pyrazole,
17α-acetoxy-16β-methyl-20-oxo-2'-(p-fluorophenyl)-4,6-pregnadieno-[3,2-c]pyrazole,
17α-acetoxy-16-methylene-20-oxo-2'-(p-fluorophenyl)-4,6-pregnadieno-[3,2-c]pyrazole,
17α-acetoxy-6-chloro-16α-methyl-20-oxo-2'-(p-fluorophenyl)-4,6-pregnadieno-[3,2-c]pyrazole,
17α-acetoxy-6-chloro-16β-methyl-20-oxo-2'-(p-fluorophenyl)-4,6-pregnadieno-[3,2-c]pyrazole,
17α-acetoxy-6-chloro-16-methylene-20-oxo-2'-(p-fluorophenyl)-4,6-pregnadieno-[3,2-c]pyrazole,
17α-acetoxy-6-fluoro-16α-methyl-20-oxo-2'-(p-fluorophenyl)-4,6-pregnadieno-[3,2-c]pyrazole,
17α-acetoxy-6-fluoro-16β-methyl-20-oxo-2'-(p-fluorophenyl)-4,6-pregnadieno-[3,2-c]pyrazole,
17α-acetoxy-6-fluoro-16-methylene-20-oxo-2'-(p-fluorophenyl)-4,6-pregnadieno-[3,2-c]pyrazole,
17α-acetoxy-6,16α-dimethyl-20-oxo-2'-(p-fluorophenyl)-4,6-pregnadieno-[3,2-c]pyrazole,
17α-acetoxy-6,16β-dimethyl-20-oxo-2'-(p-fluorophenyl)-4,6-pregnadieno-[3,2-c]pyrazole,
17α-acetoxy-6-methyl-16-methylene-20-oxo-2'-(p-fluorophenyl)-4,6-pregnadieno-[3,2-c]pyrazole,
17α-acetoxy-6,21-difluoro-20-oxo-2'-(p-fluorophenyl)-4,6-pregnadieno-[3,2-c]pyrazole,
17α-acetoxy-21-fluoro-6,16α-dimethyl-20-oxo-2'-(p-fluorophenyl)-4,6-pregnadieno-[3,2-c]pyrazole,
17α-caproyloxy-20-oxo-4,6-pregnadieno-[3,2-c]pyrazole,
17α-caproyloxy-6-chloro-20-oxo-4,6-pregnadieno-[3,2-c]pyrazole,
17α-caproyloxy-6-fluoro-20-oxo-4,6-pregnadieno-[3,2-c]pyrazole,
17α-caproyloxy-6-methyl-20-oxo-4,6-pregnadieno-[3,2-c]pyrazole,
17α-caproyloxy-6,16α-dimethyl-4,6-pregnadieno-[3,2-c]pyrazole,
17α-acetoxy-20-oxo-19-nor-4,6-pregnadieno-[3,2-c]pyrazole,
17α-acetoxy-6-chloro-20-oxo-19-nor-4,6-pregnadieno-[3,2-c]pyrazole,
17α-acetoxy-6-fluoro-20-oxo-19-nor-4,6-pregnadieno-[3,2-c]pyrazole,
17α-acetoxy-6-methyl-20-oxo-19-nor-4,6-pregnadieno-[3,2-c]pyrazole,
17α-acetoxy-6,16α-dimethyl-20-oxo-19-nor-4,6-pregnadieno-[3,2-c]pyrazole,
6-chloro-17α-methoxy-20-oxo-4,6-pregnadieno-[3,2-c]pyrazole,
17α-methoxy-20-oxo-4,6-pregnadieno-[3,2-c]pyrazole,
6-fluoro-17α-methoxy-20-oxo-4,6-pregnadieno-[3,2-c]pyrazole,
17α-methoxy-6-methyl-20-oxo-4,6-pregnadieno-[3,2-c]pyrazole,
6,16α-dimethyl-17α-methoxy-20-oxo-4,6-pregnadieno-[3,2-c]pyrazole,
17α-methoxy-6,16α-dimethyl-20-oxo-2'-phenyl-4,6-pregnadieno-[3,2-c]pyrazole.

Example 28

A spore suspension is prepared in water from a slant of *Aspergillus ochraceus* (NRRL 405) and used to inoculate a 250 ml. Erlenmeyer flask containing 50 ml. of medium of the following composition:

|  | Percent |
|---|---|
| Edamin | 2 |
| Glucose | 2 |
| Corn steep liquor | 0.5 |

The inoculated flask is incubated at 28° C. on a rotary shaker for 24 hours. The steroid substrate, 17α-acetoxy-20-oxo-4-pregneno-[3,2-c]pyrazole, is added as a dimethyl-formamide solution (100 mg./ml.) to yield the equivalent of 1.0 g./l. of broth (0.5 ml./flask). After an additional incubation of 24 hours under the same environmental conditions as the growth phase, the broth is harvested and the desired product isolated.

Fifty milliliters of broth charged with 50 mg. of 17α-acetoxy-20-oxo-4-pregneno-[3,2-c]pyrazole, and incubated as shown above is extracted with 3×20 ml. of ethyl acetate. The extract is vacuum concentrated to an oil, the oil dissolved in a few drops of chloroform and the latter solution chromatographed on paper in the system n-hexane - benzene (1:1)/dimethylformamidemethanol (1:1).

A 325 ml. broth composite from an incubation of 480 mg. of 17α-acetoxy-20-oxo-4-pregneno-[3,2-c]pyrazole is extracted with 3×325 ml. of ethyl acetate. The extract is water washed and vacuum concentrated to a small volume. Paper chromatography in the system n-hexane-benzene (1:1)/dimethylformamidemethanol (1:1) shows the presence of 17α-acetoxy-11β-hydroxy-20-oxo-4-pregneno-[3,2-c]pyrazole.

The reaction product is dissolved in 20 ml. of benzene and charged to a column containing 50 g. of acid washed alumina. The column is washed with benzene and the unreacted starting material eluted with ethyl-benzene mixtures, to obtain 17α-acetoxy-11β-hydroxy-20-oxo-4-pregneno-[3,2-c]pyrazole.

Various changes and modifications may be made in carrying out the present invention without departing from the spirit and scope thereof. Insofar as these changes and modifications are within the purview of the annexed claims, they are to be considered as part of our invention.

We claim:
1. A compound selected from the group of compounds having structural formulas A and B and the Δ⁴,⁶-analogues of said compounds

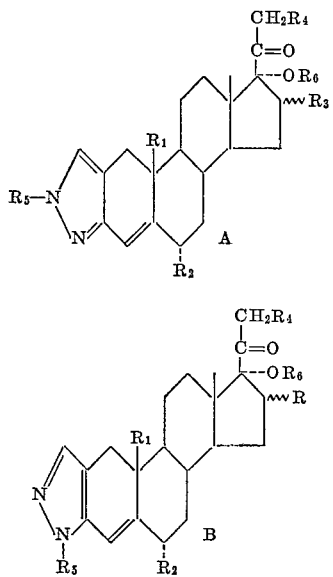

wherein $R_1$ is selected from the group consisting of hydrogen and methyl, $R_2$ is selected from the group consisting of hydrogen, α-methyl, α-fluoro and α-chloro, $R_3$ is selected from the group consisting of hydrogen, α-methyl, β-methyl and methylene, $R_4$ is hydrogen, $R_5$ is selected from the group consisting of hydrogen, lower alkyl, lower cycloalkyl, lower aralkyl, aryl, a pyridyl, pyridyloxide, thiophene and pyrimidyl, and $R_6$ is selected from the group consisting of lower hydrocarbon carboxylic acyl and lower alkyl.

2. 17α-acetoxy-20-oxo-4-pregneno-[3,2-c]pyrazole.
3. 17α - acetoxy - 20 - oxo - 19 - nor - 4 - pregneno-[3,2-c]pyrazole.
4. 17α - acetoxy - 6α - methyl - 20 - oxo - 2' - phenyl-4-pregneno-[3,2-c]pyrazole.
5. 17α - acetoxy - 6,16α - dimethyl - 20 - oxo - 4,6-pregnadieno-[3,2-c]pyrazole.
6. 17α - methoxy - 6,16α - dimethyl - 20 - oxo - 2'-phenyl-4,6-pregnadieno-[3,2-c]pyrazole.
7. 17α - acetoxy - 4,6 - pregnadieno - [3,2 - c]pyrazole.
8. 17α - acetoxy - 6 - chloro - 16α - methyl - 20 - oxo-4,6 - pregnadieno - [3,2 - c]pyrazole.
9. 17α - acetoxy - 6 - chloro - 16α - methyl - 20 - oxo-2'-phenyl-4,6-pregnadieno-[3,2-c]pyrazole.
10. 17α - acetoxy - 6,16α - dimethyl - 20 - oxo - 2'-phenyl-4,6-pregnadieno-[3,2-c]pyrazole.
11. 17α - acetoxy - 6,16β - dimethyl - 20 - oxo - 2'-phenyl-4,6-pregnadieno-[3,2-c]pyrazole.
12. 17α - acetoxy - 6,16β - dimethyl - 20 - oxo - 4,6-pregnadieno-[3,2-c]pyrazole.
13. 17α - caproyloxy - 6,16α - dimethyl - 20 - oxo - 4,6-pregnadieno-[3,2-c]pyrazole.
14. 17α - acetoxy - 6 - methyl - 20 - oxo - 2' - phenyl-4,6-pregnadieno-[3,2-c]pyrazole.
15. 17α - acetoxy - 6 - chloro - 20 - oxo - 2' - phenyl-4,6-pregnadieno-[3,2-c]pyrazole.
16. 17α - acetoxy - 6 - chloro - 20 - oxo - 4,6 - pregnadieno-[3,2-c]pyrazole.

References Cited in the file of this patent
UNITED STATES PATENTS
2,945,852   Bergstrom _____ July 19, 1960